US006771218B1

(12) United States Patent
Lalezari et al.

(10) Patent No.: US 6,771,218 B1
(45) Date of Patent: Aug. 3, 2004

(54) ELECTRONICALLY AGILE MULTI-BEAM ANTENNA

(75) Inventors: Farzin Lalezari, Louisville, CO (US); Theresa Cronin Boone, Boulder, CO (US)

(73) Assignee: Ball Aerospace & Technologies Corp., Broomfield, CO (US)

( * ) Notice: Subject to any disclaimer, the term of this patent is extended or adjusted under 35 U.S.C. 154(b) by 1825 days.

(21) Appl. No.: 08/392,312

(22) Filed: Feb. 13, 1995

Related U.S. Application Data

(63) Continuation-in-part of application No. 07/944,199, filed on Sep. 11, 1992.
(51) Int. Cl.[7] ................................................ H01Q 3/26
(52) U.S. Cl. ...................................... 342/373; 342/374
(58) Field of Search ............................... 342/368, 371, 342/372, 373, 374, 157–8; 343/705, 708, 777, 700 MS

(56) References Cited

U.S. PATENT DOCUMENTS

| | | | |
|---|---|---|---|
| 3,202,992 A | 8/1965 | Kent et al. ................... 343/100 |
| 3,523,659 A | 8/1970 | Epperson, Jr. .............. 244/3.17 |
| 3,530,485 A | 9/1970 | Radford ....................... 343/854 |
| 3,531,803 A | 9/1970 | Rosen et al. ................ 343/100 |
| 3,699,574 A | * 10/1972 | O'Hara et al. ............... 342/153 |
| 3,740,002 A | 6/1973 | Schaefer ..................... 244/3.19 |
| 3,816,830 A | 6/1974 | Giannini ............... 343/100 SA |
| 3,821,740 A | 6/1974 | Ehrlich ................. 343/100 SA |
| 3,858,206 A | 12/1974 | Scheidler et al. ........... 343/7 A |
| 3,860,929 A | 1/1975 | Crain ...................... 343/113 R |
| 3,868,695 A | 2/1975 | Kadak .......................... 343/778 |
| 3,897,918 A | 8/1975 | Gulick, Jr. et al. ......... 244/3.19 |
| 3,922,685 A | 11/1975 | Opas ........................... 343/854 |
| 3,940,770 A | * 2/1976 | Fassett et al. ................ 343/754 |
| 3,964,066 A | 6/1976 | Nemit .................. 343/100 SA |

(List continued on next page.)

OTHER PUBLICATIONS

Johnson and Jasik, *Antenna Engineering Handbook*, Second Edition, McGraw Hill Co., 1984, Chapters 12, 20 and 21.

Steyskal, H., "Phased Arrays 1985 Symposium—Proceedings," Rome Air Development Center Technical Report Number RADC–TR–85–170, Sep. 1985, pp. 331–350.

Skolnik, M., *Radar Handbook*, McGraw Hill Co. 1970, pp. 11–54–11–57.

(List continued on next page.)

*Primary Examiner*—Gregory C. Issing
(74) *Attorney, Agent, or Firm*—Sheridan Ross P.C.

(57) ABSTRACT

The present invention provides an antenna system including a body for use in determining N unknown parameters values relating to an object located in the vicinity of the system. The system further includes an antenna array comprised of a plurality of elements that are spaced to reduce ambiguities in the subsequently determined N values. In one embodiment, several pair of elements are used. The spacing between the elements comprise the pairs and the spacing between pairs reduces ambiguities. The antenna system also includes a beamformer for producing a plurality of beams and a device for using the plurality of beams to determine N values associated with the object. The amplitude of the plurality of beams can be compared to obtain coarse data on the object. The phases of the plurality of spatially independent but overlapping beams are compared to realize an interferometer that can provide coarse resolution data and/or fine resolution data on the position and/or polarization of an object relative to the antenna system. The amplitudes of the beams can also be compared to obtain coarse data on the position and/or polarization of the object. The beamformer includes a switching network for selecting which elements of the antenna array form the subsets. This permits, for example, the position of the beams to be moved and the baseline of the beams to be varied.

75 Claims, 25 Drawing Sheets

U.S. PATENT DOCUMENTS

| | | | |
|---|---|---|---|
| 4,001,763 A | 1/1977 | Kits van Heyningen | 340/3 PS |
| 4,010,474 A | 3/1977 | Provencher | 343/814 |
| 4,123,759 A | 10/1978 | Hines et al. | 343/854 |
| 4,176,322 A | 11/1979 | Kommrusch | 325/369 |
| 4,204,210 A | 5/1980 | Hose | 343/6 R |
| 4,204,655 A | 5/1980 | Gulick et al. | 244/3.19 |
| 4,257,050 A | 3/1981 | Ploussios | 343/854 |
| 4,264,907 A | 4/1981 | Durand, Jr. et al. | 343/6 ND |
| 4,277,787 A | 7/1981 | King | 343/100 SA |
| 4,451,831 A | 5/1984 | Stangel et al. | 343/374 |
| 4,509,052 A | 4/1985 | Cash | 343/418 |
| 4,540,139 A | 9/1985 | Levy et al. | 244/3.19 |
| 4,544,927 A | 10/1985 | Kurth et al. | 343/373 |
| 4,638,320 A | 1/1987 | Eggert et al. | 342/442 |
| 4,924,235 A | 5/1990 | Fujisaka et al. | 342/374 |
| 5,093,668 A | 3/1992 | Sreenivas | 342/374 |
| 5,220,330 A * | 6/1993 | Salvail et al. | 342/62 |

OTHER PUBLICATIONS

Mailloux, "Conformal and Low–Profile Arrays", Chapter 21 in *Antenna Engineering Handbook*, McGaw–Hill, Johnson et al., eds., 2nd ed., 1984.

Schuchardt et al., "Seeker Antennas", Chapter 38 in *Antenna Engineering Handbook*, McGraw–Hill, Johnson et al., eds., 2nd ed., 1984.

Kennedy et al., "Direction–Finding Antennas and Systems", Chapter 39 in *Antenna Engineering Handbook*, McGraw–Hill, Johnson et al., eds., 2nd ed., 1984.

* cited by examiner

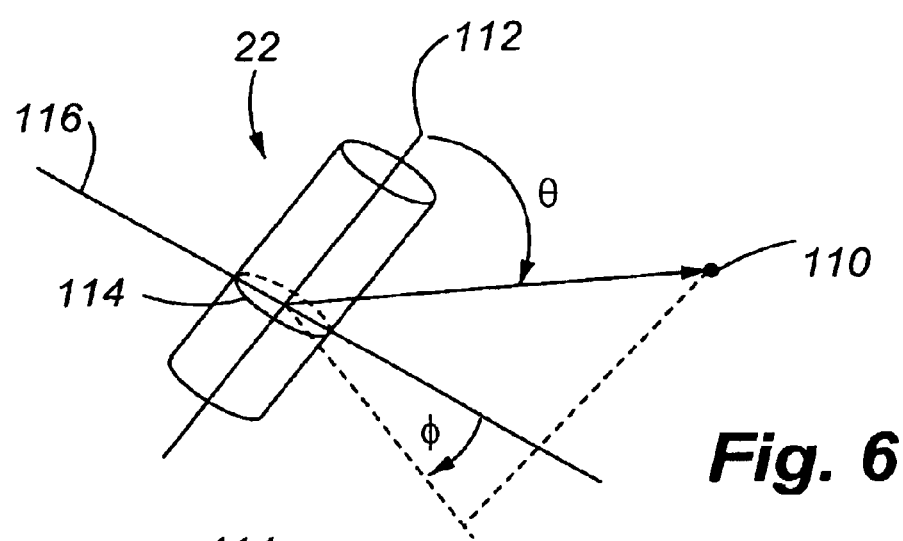
Fig. 6
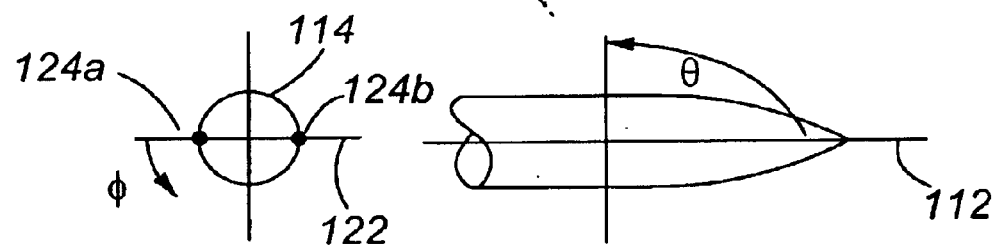
Fig. 7B  Fig. 7A

| State | Left | Right | Coverage (deg)* (See Subtitle) | DF | Data |
|---|---|---|---|---|---|
| 1 | 1 | 2 | 11.25 TO 33.75 | Coarse/Amplitude | |
| 2 | 1 | 1 | 0 TO 22.5 | Fine/Phase | √ |
| 3 | 2 | 3 | 33.75 to 56.25 | Coarse/Amplitude | |
| 4 | 2 | 2 | 22.5 TO 45 | Fine/Phase | √ |
| 5 | 3 | 4 | 56.25 TO 78.75 | Coarse/Amplitude | |
| 6 | 3 | 3 | 45 TO 67.5 | Fine/Phase | √ |
| 7 | 4 | 5 | 78.75 TO 101.25 | Coarse/Amplitude | |
| 8 | 4 | 4 | 67.5 TO 90 | Fine/Phase | √ |
| 9 | 5 | 6 | 101.25 TO 123.75 | Coarse/Amplitude | |
| 10 | 5 | 5 | 90 TO 112.5 | Fine/Phase | √ |
| 11 | 6 | 7 | 123.75 TO 146.25 | Coarse/Amplitude | |
| 12 | 6 | 6 | 112.5 to135 | Fine/Phase | √ |
| 13 | 7 | 8 | 146.25 TO 168.75 | Coarse/Amplitude | |
| 14 | 7 | 7 | 135 TO 157.5 | Fine/Phase | √ |
| 15 | 8 | 9 | 168.75 TO 191.25 | Coarse/Amplitude | |
| 16 | 8 | 8 | 157.5 TO 180 | Fine/Phase | √ |
| 17 | 9 | 10 | 191.25 TO 213.75 | Coarse/Amplitude | |
| 18 | 9 | 9 | 180 TO 202.5 | Fine/Phase | √ |
| 19 | 10 | 11 | 213.75 TO 236.25 | Coarse/Amplitude | |
| 20 | 10 | 10 | 202.5 TO 225 | Fine/Phase | √ |
| 21 | 11 | 12 | 236.25 TO 258.75 | Coarse/Amplitude | |
| 22 | 11 | 11 | 225 TO 247.5 | Fine/Phase | √ |
| 23 | 12 | 13 | 258.75 TO 281.25 | Coarse/aAmplitude | |
| 24 | 12 | 12 | 247.5 TO 270 | Fine/Phase | √ |
| 25 | 13 | 14 | 281.25 TO 303.75 | Coarse/Amplitude | |
| 26 | 13 | 13 | 270 TO 292.5 | Fine/Phase | √ |
| 27 | 14 | 15 | 303.75 TO 326.25 | Coarse/Amplitude | |
| 28 | 14 | 15 | 292.5 TO 314 | Fine/Phase | √ |
| 29 | 15 | 16 | 326.25 TO 348.75 | Coarse/Amplitude | |
| 30 | 15 | 15 | 315 TO 337.5 | Fine/Phase | √ |
| 31 | 16 | 1 | 348.75 TO 11.25 | Coarse/Amplitude | |
| 32 | 16 | 16 | 337.5 TO 360/0 | Fine/Phase | √ |

Fig. 14

Fig. 17A
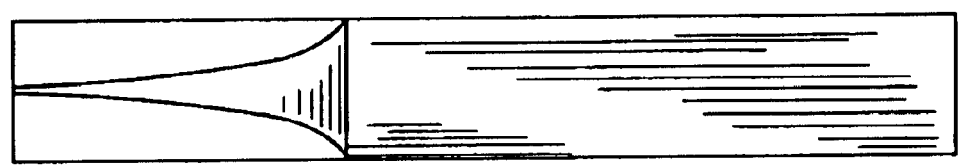
Fig. 17B

ELECTRONICALLY AGILE MULTI-BEAM ANTENNA

This application is a continuation-in-part of application Ser. No. 07/944,199, filed Sep. 11, 1992.

BACKGROUND OF THE INVENTION

1. Field of the Invention

The present invention relates to antenna systems and, in particular, to an antenna system that uses a multi-element antenna array to receive an electromagnetic signal and generate a plurality of electrical signals that are representative of the received electromagnetic signal and a multi-beam beamformer to produce at least two spatially independent, overlapping beams from the electrical signals provided by the array.

2. Description of the Related Art

Presently, antenna systems are used in many aeronautical applications. One application for an antenna system is as part of a radar on an aircraft where the antenna system is used to obtain positional information on the objects in the space surrounding the aircraft. This positional information is then typically used to either avoid an object, such as another aircraft, or to home in on an object, such as a navigational beacon.

Present radar antenna system technology is becoming increasingly hard-pressed to provide sufficient information on the space around an aircraft as the speed of the aircraft on which the radar antenna system is mounted and of the other aircraft in the surrounding airspace increases. Specifically, present radar antenna systems are generally proving inadequate with respect to their detection range, field of view, resolution, or combinations thereof in situations that involve high-speed aircraft. For example, if the radar antenna system in one of two high-speed aircraft that are approaching one another has a short range, the radar antenna system may not be able to provide information on the other aircraft in time to avoid a collision. If, on the other hand, the radar antenna system in an aircraft has a limited area of coverage, and the aircraft is attempting to join up with a high-speed aircraft, the high-speed aircraft may not be detected with such a radar antenna system. Further, if the antenna system in an aircraft has a limited resolution, the ability of the aircraft to make the appropriate course corrections may be compromised.

Further, high-speed aircraft also exhibit high skin temperatures that are on the order of 3000° F. and higher. These temperatures present severe radiation problems to any radar antenna system mounted on the aircraft. Conventional approaches to this problem ordinarily involve the design of a radome, which protects the radar antenna system and forms part of the skin of the aircraft, that employs exotic materials and/or active cooling systems that are generally complex and expensive.

Further, to realize higher velocities and/or improved maneuvering characteristics, the aerodynamics of aircraft are being constantly improved. However, the ability to realize the improved performance is becoming increasing sensitive to anything that may affect the aerodynamics of the aircraft. Consequently, the design of a radar antenna system that is to be deployed on aircraft must consider the effects of the radar antenna system on the aerodynamics of the aircraft.

The ability of aircraft-based radar antenna systems to provide adequate information on objects in the surrounding space is also becoming increasingly difficult due to the reductions in the radar cross-sections of many of these objects. For example, as aircraft become more aerodynamic, their radar cross-section typically decreases, thereby making it more difficult for a radar antenna system to detect the aircraft. As a result, other types of sensors or detectors that operate on different principles, such as electro-optic sensors, are being used in conjunction with, or to supplement the radar. At least with respect to aircraft-based radar, the space to accommodate additional sensors, and especially those sensors that are to be used in high-speed aircraft environments, is limited. Consequently, the impact of a radar antenna system must be considered in such situations.

Another application in which the performance of present antenna systems is becoming increasingly less reliable is when there is a need for a very focused or narrow beam (transmitted or received) with low side lobes and/or high gain. A narrow beam with low side lobes is, for example, desirable in situations in which the goal is to reduce the possibility of the signals produced by either the antenna system or an object in the antenna system's scanning area from being intercepted. High gain is also desirable in such a situation because it allows the antenna system to detect objects that produce low-power signals, or, stated another way, to operate in environments where there is a low signal-to-noise ratio (SNR). Present antenna systems that use partially overlapping beams in such situations have become increasingly less reliable as the need to operate in lower SNR environments increases.

Yet a further concern with respect to antenna systems is that as the performance requirements of the various applications has increased, the antenna systems that are designed to meet these requirements have tended to become more complex. This is of concern because increasing complexity generally results in a reduced reliability that is unacceptable in many applications.

Another concern with respect to antenna systems is that the performance may be more than is needed or acceptable for a particular application. Further, even though such an antenna system may be relatively inexpensive, the cost of the system is probably still greater than is necessary. Consequently, there is a need to assure that an antenna system is capable of achieving the necessary or acceptable performance for a particular application at a reasonable cost while also exhibiting a reduced complexity and increased reliability relative to known antenna systems.

SUMMARY OF THE INVENTION

Based on the foregoing, an object of the present invention is to provide an antenna system that addresses the high range, resolution, and field of view requirements of high-speed aircraft environments.

A further object of the present invention is to provide an antenna system that can be used in high-speed, high-temperature environments which substantially reduces the need for a radome formed of exotic material and/or the use of a complex cooling system.

Yet another object of the present invention is to provide an antenna system that is sensitive to the aerodynamics of the aircraft on which it is mounted.

Another object of the present invention is to provide an antenna system that addresses the concern for space on an aircraft and especially the space associated with the frontal surface or nose portion of an aircraft.

A further object of the present invention is to provide an antenna system that addresses applications in which the interception of an antenna system signal is undesirable.

Yet a further object of the present invention is to provide an antenna system that is relatively simple and reliable.

Another object of the present invention is to provide an antenna system that achieves the necessary or acceptable level of performance for a particular application at a reasonable cost while also striving to achieve a reduced level of the complexity and increased level of reliability relative to known antenna systems.

One embodiment of the antenna system of the present invention that is suitable for aircraft or ground-based applications includes an antenna array for receiving an electromagnetic signal and providing a plurality of signals that are representative of the electromagnetic signal. The antenna array is comprised of a plurality of antenna elements, each of which is capable of providing one signal of the plurality of signals. The antenna system further includes a beamformer for processing a first subset and a second subset of the plurality of signals provided by the antenna array to produce two "beams". The beams are electrical signals that are representative of the electromagnetic signal received from a particular area. To be able to change the characteristics of the beams, the beamformer includes a switching network that permits selection of which antenna elements will provide the signals comprising the first and second subsets. For example, by changing the number of antenna elements whose signals comprise the beams, the beamwidths of the beams can be changed. Similarly, by changing the identity of the antenna elements whose signals make up the first and second subsets, the baseline between the two beams can be altered. This can be useful in resolving positional ambiguities. The antenna system further includes a device for cooperatively using the first and second beams produced by the beamformer to determine information on the surrounding environment, such as the location of an object. Specifically, the device can perform an amplitude comparison of the two beams to attain coarse positional information and a phase comparison of the two beams to realize an interferometer that provides fine or high resolution positional information.

In another embodiment of the antenna system that includes an antenna array, the beamformer operates such that the two beams formed by it are spatially independent or, stated another way, formed from the signals provided by two different subsets of antenna elements. Additionally, the formed beams are representative of the electromagnetic signals received by the two different subsets from overlapping areas.

Yet another embodiment of the antenna system of the present invention that is particularly adapted for applications in which the antenna system is to be mounted on a moving craft, such as an aircraft, and especially a high speed moving craft, includes an antenna array for providing a plurality of signals that has a low profile with respect to the surface of the craft to reduce any adverse impacts upon the aerodynamics of the craft. Alternatively, or in addition, the antenna array can be mounted on the side of the craft. By mounting the antenna array on the side of the craft, space for other sensors that are preferably located in the front or nose portion of the craft is increased. Furthermore, the side location also substantially reduces temperature related problems and the need for exotic materials or complex cooling systems, especially if the antenna array is also conformal with the side surface. This embodiment of the antenna system further comprises a multi-beam beamformer for producing two beams or more from the signals produced by the antenna array and a device for cooperatively using the two or more beams to provide information on the surrounding space.

The present invention also provides a method for operating an antenna system that includes the step of providing an antenna array with a plurality of elements, each element being capable of providing one of the plurality of signals. The method further includes the steps of using the signals provided by a subset of the plurality of elements to produce a first beam and using the signals provided by another subset of the plurality of elements to produce a second beam. Also included in the method is the step of cooperatively using the first and second beams to determine information on the space surrounding the antenna array. This step can involve a phase comparison of the two beams to implement an interferometer that provides fine or high resolution data on the surrounding space. This step can also include an amplitude comparison of two beams to generate coarse data on the surrounding environment. The method further includes electronically changing or switching the elements of the first and second subsets that are used to form the first and second beams. This can include changing the identity of the elements to, for example, vary the baseline between the two beams and/or changing the number of elements to alter the beamwidths of the two beams.

The present invention also provides an antenna system that is capable of using a relatively sparsely populated antenna array to achieve adequate performance while also exhibiting reduced complexity and improved reliability relative to other systems. The antenna system includes a body with a longitudinal axis and a plane that is located substantially perpendicular to the longitudinal axis. A plurality of elements that form an antenna array are attached to the body and located in a ring within the noted plane. The array is comprised of at least three elements. Three elements can enable the solution of both azimuth and elevation data unambiguously. The system further includes a beamformer for selectively using at least two of the signals provided by the antenna elements that are located in less than a 180° range to form at least two beams. Also part of the system is a device that uses the two beams to determine the value of a parameter associated with an object located in the vicinity of the system. For instance, the two beams may be used to determine the elevational angle or azimuth angle of the object relative to the longitudinal axis of the body.

In one embodiment, the sparse population of antenna elements is achieved using broadband antenna elements.

To aid in resolving ambiguities in determining the values of one or more parameters associated with the object, the spacing between antenna elements has been carefully chosen. In one embodiment, the antenna array includes a discrete pair of elements, i.e. a pair of elements that is distinctly separated from the other elements of the array, with the spacing between the elements comprising the pair of elements chosen to aid in resolving the noted ambiguities. In another embodiment, several discrete pair of antenna elements are employed in which the distance between adjacent pairs of elements is greater than the distance between the elements comprising a pair of elements. In one case, the distance between immediately adjacent pairs of elements is substantially equal. In another case, the distance between immediately adjacent pair of elements varies. It should also be appreciated that the noted spacings between discrete pairs of antenna elements can be achieved with an array of elements that are equally spaced from one another and with certain of the elements grounded to achieve the desired spacing between discrete pairs of elements.

In one embodiment, the beamformer forms the two or more beams from the signals provided by elements that are not only within the noted 180° range but also immediately adjacent to one another.

In a further embodiment, the beamformer forms the first beam from the signal provided by only one element and forms the second beam from the signal provided by the element immediately adjacent to the element that provides the signal to form the first beam.

In yet another embodiment, the beamformer includes multiple channels so that multiple beams can be formed simultaneously and thereby expedite the determination of unknown parameter values associated with the object relative to a beamformer with one or fewer channels.

The present invention also provides a method of operating an electrically agile, mobile antenna system to determine N unknown parameter values associated with an object located in the vicinity of the antenna system. The method includes forming a plurality of beams from the signals provided by a plurality of antenna elements that are located in a ring about the longitudinal axis of a body on which the elements are mounted. These beams are used to roughly determine the location of the object relative to body. In one embodiment, the amplitudes of the beams are compared to one another to roughly determine the location of the object. Once the location of the object is roughly known, N+1 different beams are formed, where N is the number of different parameters whose values are presently unknown or uncertain and N is at least three. For example, if the four values associated with the elevation, azimuth, and two polarization parameters for the object are unknown or uncertain, five different beams are formed from the signals provided by the antenna elements that are within a segment in space in which the object has been roughly located. This second set of beams is used to determine values for the parameters. In one embodiment, the phases of the beams are compared to one another to determine the parameter values. If high resolution is required, further beams can be generated from the signals provided by elements that are further apart, phase comparisons of the beams made, and the value of a particular parameter refined. In various embodiments, the noted beams are produced sequentially, simultaneously, or with some beams produced simultaneously and the remaining beams produced at a later time depending on the application.

BRIEF DESCRIPTION OF THE DRAWINGS

FIG. 6 illustrates the geometrical or positional relationship between the aircraft shown in FIG. 1 and an object in the space surrounding the aircraft;

FIGS. 7A and 7B illustrate the geometrical relationships used to specify the position of an object relative to the aircraft and antenna system of FIG. 1 when the forward looking receive array is being used to obtain high resolution data;

FIG. 14 is the truth table for the two independent switching networks illustrated in FIG. 13;

FIGS. 17A and 17B are side and top views, respectively, of a broadband element suitable for incorporation in the antenna array illustrated in FIG. 16;

DETAILED DESCRIPTION OF THE EMBODIMENTS OF THE INVENTION

Figure 1:
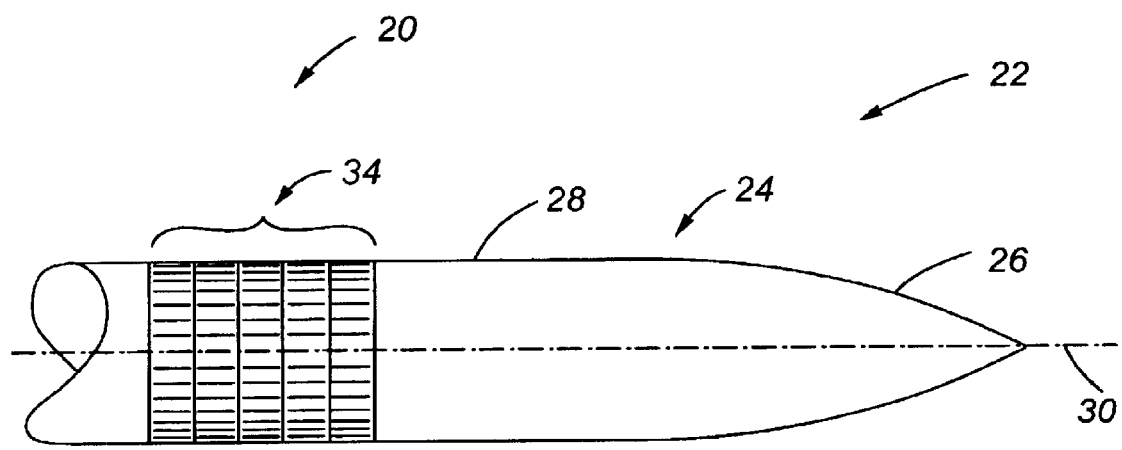
FIG. 1 illustrates a first embodiment of the antenna system of the present invention in which the antenna system forms part of a radar and includes an array that is mounted conformal with the side of an aircraft.

FIG. 1 illustrates a first embodiment of the antenna system of the present invention 20, hereinafter referred to as antenna system 20. The antenna system 20 is part of a radar that is located on an aircraft 22 which has an exterior surface 24 comprised of a front or nose surface 26, a cylindrical side surface 28, and a longitudinal axis 30 that also defines the direction of movement of the aircraft 22. To distinguish the nose surface 26 from the side surface 28, any point on the nose surface 26 has a surface area vector that is other than perpendicular to the longitudinal axis 30 and any point on the side surface has an area vector that is substantially perpendicular to the longitudinal axis 30.

The antenna system 20 includes an antenna array 34 that is mounted on the side surface 28 of the aircraft 22 such that it has a low profile with respect to the side surface 28. In this case, the antenna array is substantially conformal with the side surface 28. The low-profile or conformal mounting of the antenna array 34 on the side surface 28 has several benefits. Namely, by mounting the antenna array 34 so that it is conformal with, or has a low profile relative to, the exterior surface 24 of the aircraft 22, any adverse effects of the antenna array 34 upon the aerodynamic behavior of the aircraft 22 are substantially reduced. Further, the mounting of the antenna array 34 on the side surface 28 permits the space interior to the antenna array and/or the interior or exterior space between the antenna array 34 and the nose surface 26 to be used to accommodate or house other types of sensors that can be used as alternatives to, or to supplement the antenna system 20. For instance, electro-optic and/or infrared sensors can be located in this space. Mounting the antenna array 34 or a portion thereof on the nose surface 26 is also feasible should the application require or permit such a mounting. Further, the conformal or low profile mounting of the antenna array 34 on the side surface 28 substantially protects the antenna array from the high temperatures existing at the nose surface 26 when the aircraft 22 moves at high velocities. Consequently, the need for a protective radome made of exotic materials and an elaborate cooling system are substantially reduced, if not eliminated.

Figure 2:
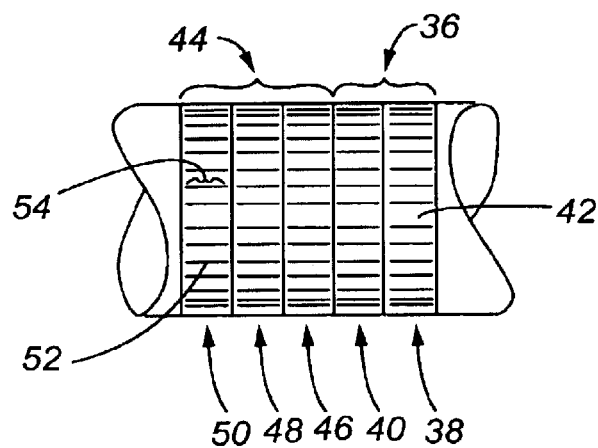
FIG. 2 identifies the forward and side looking transmit and receive arrays of the antenna-array shown in FIG. 1.
Figure 3:
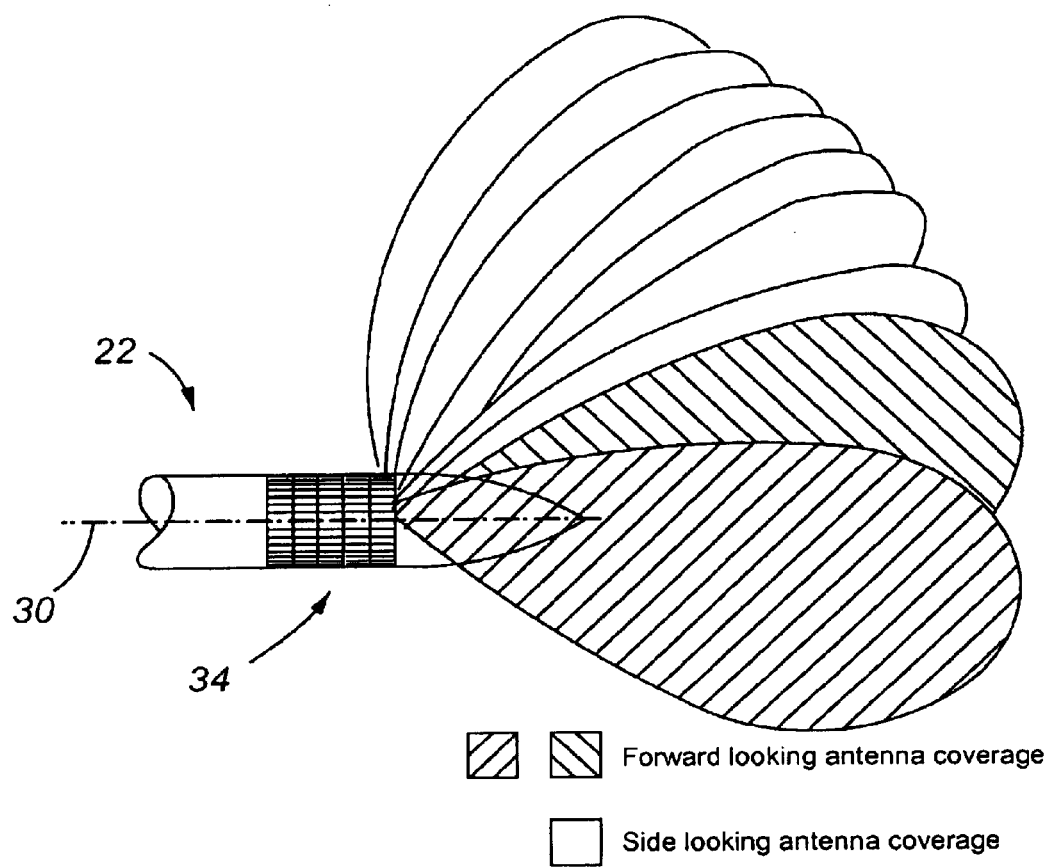
FIG. 3 illustrates the forward and side looking fields of view for the forward and side looking arrays identified in FIG. 2.

With reference to FIGS. 2 and 3, the antenna array 34 includes a forward looking array 36 for transmitting and receiving signals within a field of view that extends ±20° from the longitudinal axis 30. The forward looking array 36 includes a forward looking transmit array 38 for transmitting signals within the defined field of view and a forward looking receive array 40 for receiving signals within the defined field of view. The forward looking transmit array 38 and the forward looking receive array 40 each exist in a plane that is substantially perpendicular to the longitudinal axis 30. Further, each of the forward looking transmit array 38 and forward looking receive array 40 are comprised of thirty-two forward looking elements 42 that are equally spaced about the side surface 28 so that there are sixteen pairs of forward looking elements 42 that are located diametrically opposite to one another relative to the longitudinal axis 30.

With continuing reference to FIGS. 2 and 3, the antenna array 34 further includes a side looking array 44 for transmitting and receiving signals in a field of view that extends from ±20° with respect to the longitudinal axis to ±60° with respect to the longitudinal axis. The side looking array 44 includes a side looking transmit array 46 for transmitting signals within the defined field of view and a first side looking receive array 48 and a second side looking receive array 50 for receiving signals within the defined field of view. The side looking transmit array 46, first side looking receive array 48, and second side looking receive array 50 each exist in a plane that is substantially perpendicular to the longitudinal axis 30. Further, each is comprised of thirty-two side looking elements 52 that are equally spaced about the circumference of the side surface 28 so that there are sixteen pairs of side looking elements 52 that are located diametrically opposite to one another relative to the longitudinal axis 30. In addition, the side looking elements 52 associated with the first side looking receive array 48 and the second side looking receive array 50 are aligned with one another to form thirty-two column arrays 54.

Several variations of the antenna array 34 are possible. For instance, if the antenna array 34 is used in a semi-active radar system in which the transmitted signal is provided from another source or a passive radar system, the forward looking transmit array 38 and side looking transmit array 46 can be eliminated from the antenna array 34. Further, if the forward looking array 36 provides sufficient coverage for an application, the side looking array 44 can be excluded from the antenna array 34. Furthermore, the designs of the forward looking array 36 and the side looking array 44 can be modified to change their respective fields of view. The orientation of the planes in which the various antenna arrays lie can also be altered to suit the application. Additionally, the spacing, grouping and/or number of antenna elements comprising the forward looking array 36 and/or the side looking array 44 can be changed to suit the requirements of an application. Further, an alternative to the antenna array 34 is to replace all or subsets of the elements with single elements that have multiple feed points.

Figure 4:
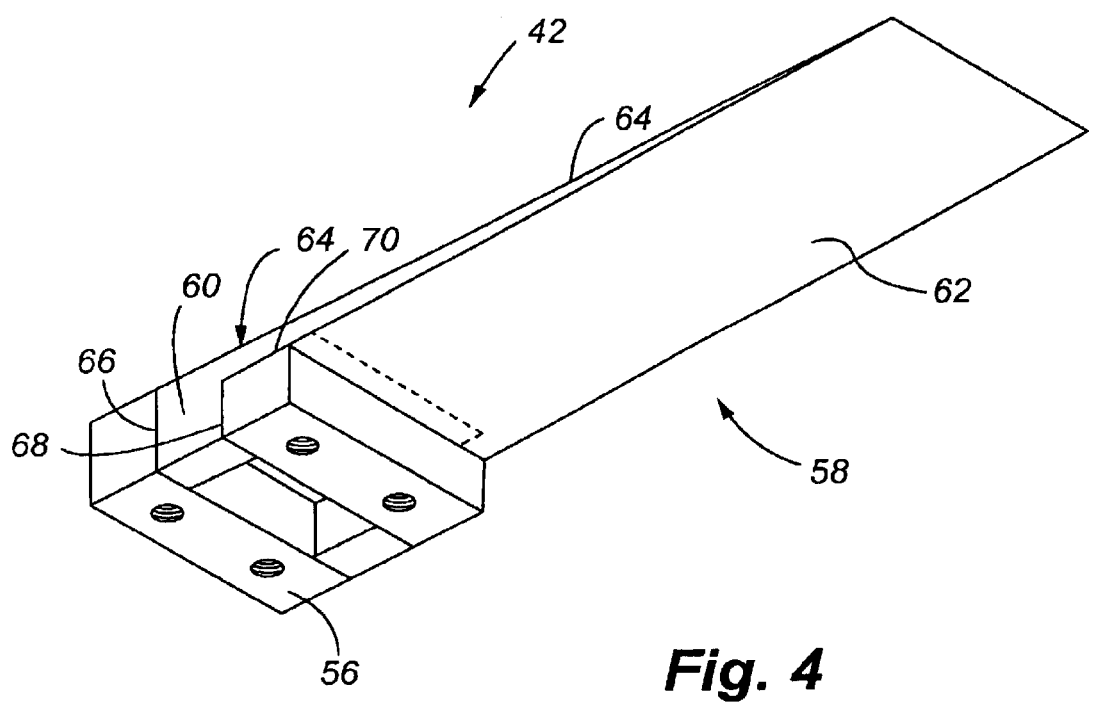
FIG. 4 illustrates one of the antenna elements that comprises the forward looking array shown in FIG. 2.

FIG. 4 illustrates one of the forward looking elements 42 that comprises the forward looking array 36. The forward looking element 42, when used to transmit a signal, produces a surface wave that, upon propagation into the environment surrounding the aircraft 22, has an endfire pattern which makes possible the forward field of view with a conformal side mounting of the element 42. Conversely, when the forward looking element is used to receive signals, it is responsive to signals within the endfire pattern. The forward looking element 42 includes a high power waveguide feed 56 and a resonating structure 58 comprised of a dielectric 60, metallized lower surface 62, exterior surface 64, which is conformal with the side surface 28 of the aircraft 22, first metallized surface 64, second metallized surface 66, third metallized surface 68, and fourth metallized surface 70. If the forward looking array 36 is mounted on the nose surface 26, a forward looking element 42 with a fan or other appropriate pattern, rather than an endfire pattern, can be used.

Figure 5A:
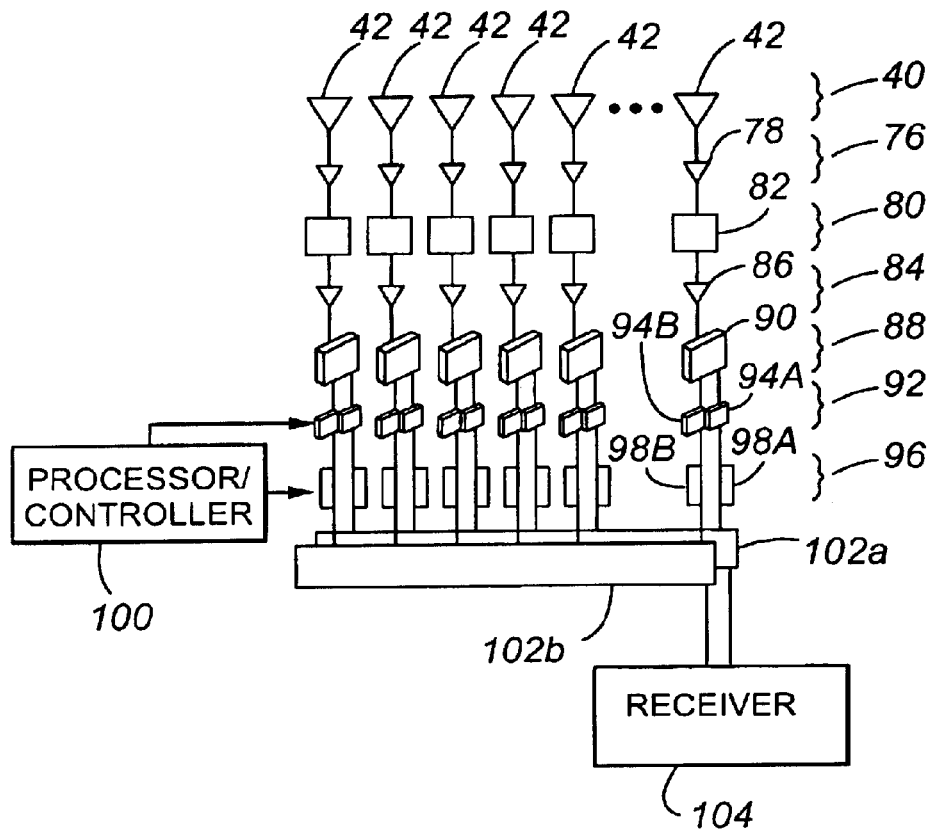
FIG. 5A illustrates the multi-beam beamformer used to process the signals produced by the receive arrays illustrated in FIG. 2.

With reference to FIG. 5A, the antenna system 20 also includes a multi-beam beamformer 74 that is capable of using the signals provided by one of the receiving arrays to substantially simultaneously generate two spatially independent, overlapping beams that can be cooperatively used to provide information relating to the position of an object with respect to the aircraft 22. Further, the multi-beam beamformer 74 permits the number and identity of the signals provided by the receive array antenna that are used to form the two beams to be selected and changed over time. As a result, the beamwidth of the beams can be changed as well as the baseline between the beams. As a matter of convenience, the multi-beam beamformer 74 is illustrated in FIG. 5A as using the signals provided by the forward looking receive array 40. It should be understood that the multi-beam beamformer 74 can be switched to utilize the signals provided by the first side looking receive array 48 and/or the second side looking receive array 50. Alternatively, a separate multi-beam beamformer can be used with the first side looking receive array 48 and/or the second side looking receive array 50.

The multi-beam beamformer 74 includes a first low noise amplifier array 76 for amplifying the signals provided by the forward looking receive array 40 while also establishing a high noise figure and maintaining signal linearity over a wide dynamic range. The first low noise amplifier array 76 is comprised of a plurality of single stage gallium arsenide (GaAs) field-effect transistor (FET) amplifiers 78, one of which is associated with each of the forward looking elements. The multi-beam beamformer 74 further includes a filter array 80 for processing the amplified signals produced by the low noise amplifier array 76, to eliminate signals outside the band of interest. The filter array 80 is comprised of a plurality of band pass filters 82, one of which is associated with each of the forward looking elements 42. Also included in the multi-beam beamformer 74 is a second low noise amplifier array 84 for amplifying the signals output by the filter array 80 so that degradation in the noise figure due to losses in the subsequent processing circuitry is reduced. The second low noise amplifier array 84 is comprised of a plurality of amplifiers 86, one of which is associated with each of the forward looking elements 42.

After the signals produced by the forward looking receive array 40 have been processed by the second low noise amplifier array 84, the multi-beam beamformer 74 splits each signal into two signals that can each be selectively used to form one of two beams that the multi-beam beamformer can be used to produce. To split the signals, the multi-beam beamformer 74 further includes a two-way power divider array 88 comprised of a plurality of two-way power dividers 90 that each split the signal output by one of the amplifiers 86 into two separate signals.

A phase shifter array 92 is included in the multi-beam beamformer 74 for phase shifting or delaying the two signals output by each of the two-way power dividers 90 of the two-way power divider array 88. The ability to phase shift the signals permits the resulting beams to be steered. Specifically, the beams can be centered on the longitudinal axis 30 of the aircraft 22 and commutated thereabout using the phase shifter array 92. Additionally, the beams can be offset from, or at an angle to, the longitudinal axis 22 and commutated about the longitudinal axis 22 using the phase shifter array 92. Stated another way, the phase-shifter array permits the beams to be scanned through the field of view of the relevant antenna array. The phase shifter array 92 is comprised of a first plurality of phase shifters 94*a* with each operating to phase shift the first of the two signals output by one of the two-way power dividers 90 and a second plurality of phase shifters 94*b* with each operating to delay or phase shift the second signal output by one of the two-way power dividers 90.

A switch array 96 is included in the multi-beam beamformer 74 for use in selecting whether the signal produced by each of the forward looking elements 42 and processed by the subsequent circuitry is used in the formation of one of two beams produced by the beamformer 74. Specifically, the switch array 96 is used to define which of the first signals output by the two-way power divider array 88 are used to produce a first beam and which of the second signals output by the two-way power divider array 88 are used to generate a second beam. To define which of the first signals output by the two-way power divider array 88 are used to generate the first beam, the switch array 96 utilizes a plurality of first switches 98*a*. A plurality of second switches 98*b* is used to define which of the second signals output by the two-way power divider array 88 are used to generate the second beam.

The state of the switches comprising the switch array 96 is controlled by a processor 100. Since the switch array 96 permits selection of which signals are used to generate the beams, the identity of the signals used to generate a beam can be changed, thereby permitting the baseline of the two beams to be modified. For example, the signals produced a first pair of elements could be used to generate the two beams for a first period of time and then the switch array 96 can be used to select the signals from a second, different pair of elements to generate the two beams during a second time period. Provided other variables remain unchanged, this results in the baseline or aperture between the beams being changed. Similarly, the switch array 96 permits the number of signals that are used to form a beam to be changed. For example, a single signal could be used to generate a beam for an initial period of time and then the switch array 96 can be used to increase the number of signals that are used to generate the beam, thereby realizing a higher gain beam in the direction of interest. Consequently, the switch array 96 can be used to vary the beamwidth of a beam. Presently, the processor 100 and the switch array 96 are designed so that up to eight signals can be combined to generate a beam. The processor 100 and switch array 96 can, of course, be modified if more signals are required to form a beam.

A first power combiner is included in the beamformer 74 for summing the first signals output by the two-way power divider array 88 that have been selected by the switch array 96 to produce a first beam in the desired direction. Likewise, a second power combiner 102*b* is included in the beamformer 74 for summing the second signals output by the two-way power divider array 88 that have been selected by the switch array 96 to form a second beam that is spatially independent but overlapping with the first beam.

The antenna system 20 further includes a dual-channel receiver 104 for cooperatively processing the first and second beams output by the first and second power combiners 102*a*, 102*b* to provide information relating to the position of an object relative to the aircraft 22. More specifically, the dual-channel receiver 104 can compare the phases or times of arrival of the first and second beams to realize an interferometer that provides fine or high resolution data relating to the position of an object relative to the aircraft 22. Additionally, the dual-channel receiver 104 can perform an amplitude comparison of the first and second beams to generate coarse data relating to the position of an object with respect to the aircraft 22. The amplitude comparison can be done with beams that are generated at substantially the same time or with beams that are generated at different times. If the comparison is done with simultaneously generated beams, the comparison is referred to as simultaneous lobing. If, on the other hand, the amplitude comparison is done on beams that are formed at different times, it is referred to as sequential lobing.

The antenna system 20 can also be implemented using a receiver with more than two channels that each process a beam. The advantage of more channels is that a larger number of simultaneous beams can be compared in phase and/or amplitude. In such a system, the power dividers of the power divider array split each of the signals into more than two signals. Relatedly, phase-shifters are added to the phase-shifter array and switches are added to the switch array to process the greater number of signals output by the power divider array. Further, additional power combiners are provided in such a system to produce the greater number of beams for subsequent processing by the receiver. Further, such an antenna system can be used with an antenna array in a single ring or multiple ring configuration. Further a non-steering version can be implemented without the use of a phase shifter. As well, both phase shifting and power combining of multiple signals can be removed to simplify the system to the elements and the switching network whereby the switching network can be implemented with absorptive or non-absorptive switches.

Figure 5B:
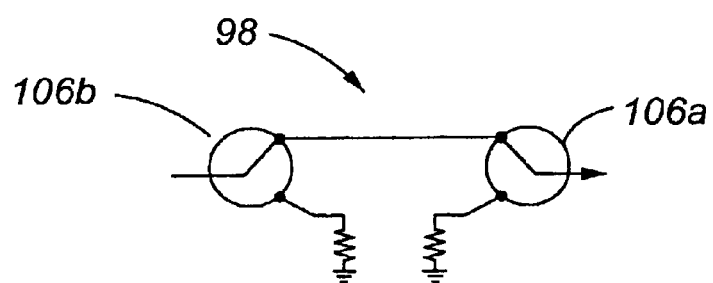
FIG. 5B illustrates one of the switches used in the switching array portion of the multi-beam beamformer illustrated in FIG. 5A.

FIG. 5B illustrates one of the first and second switches 98a, 98b comprising the switch array 96. The switch 98 includes a first single-pole, single-throw switch 106a and a second single-pole, single-throw switch 106b which are controlled by the processor 100 so that the signal produced by a forward looking element 42 is provided to one of the first and second power combiners 102a, 102b or the signal output by one of the forward looking elements 42 is grounded along with the power combiner. This results in the inputs and outputs to the switch being impedance-matched regardless of the state of the switch 98.

Figure 5C:
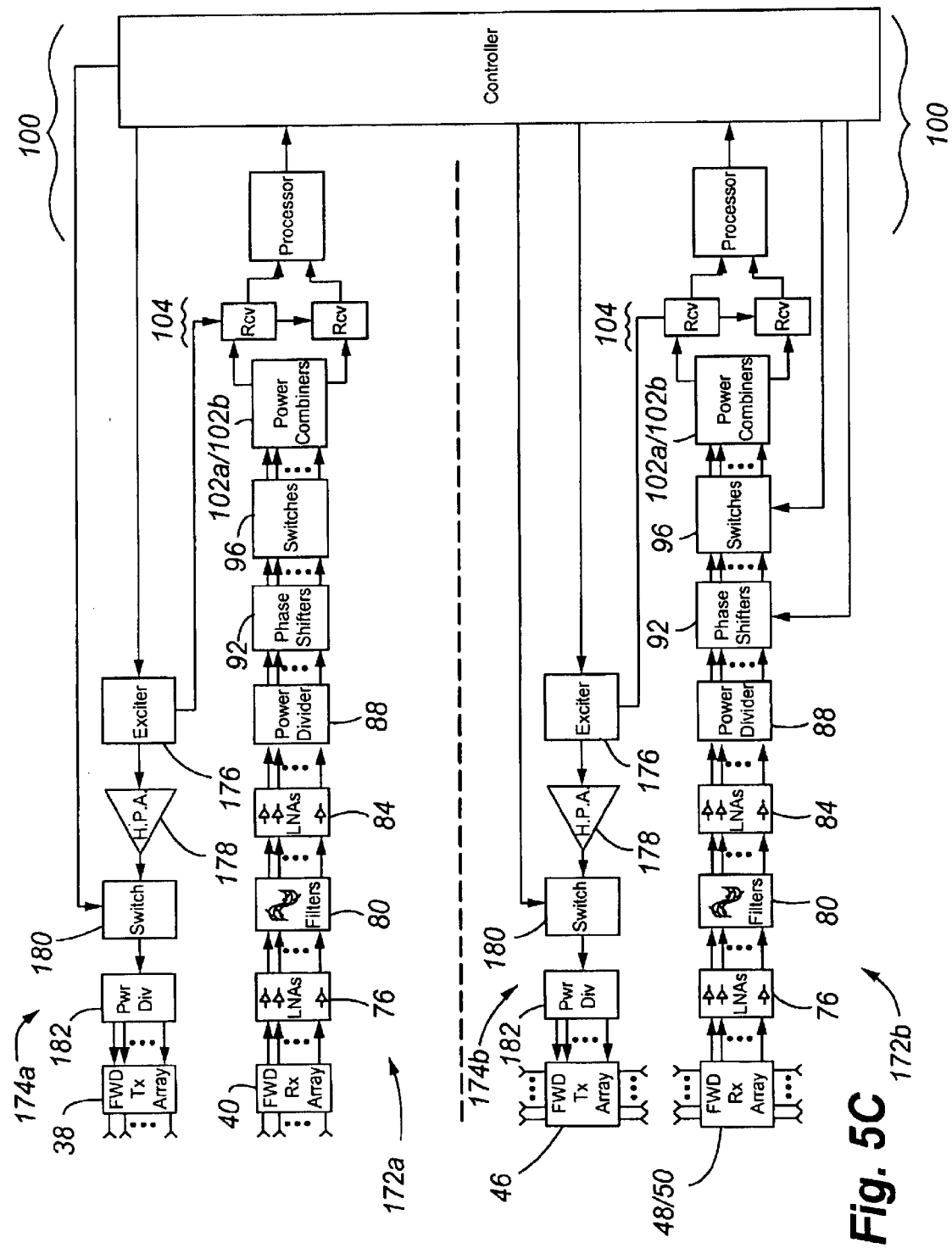
FIG. 5C illustrates the multi-beam beamformers used with the forward and side-looking receive antenna arrays as well as the circuitry used to control the forward and side-looking transmit arrays.

FIG. 5C illustrates a first multi-beam beamformer 172a that is used with the forward looking receive array 40 and a second multi-beam beamformer 172b that is used with the first and second side-looking receive arrays 48, 50. Also shown is forward transmit circuitry 174a that is used to control the signal output by the forward looking transmit array 38 and side looking transmit circuitry 174b that is used to control the signal output by the side looking transmit array 46. Each of the forward transmit circuitry 174a and side looking transmit circuitry 174b include an exciter or oscillator 176 that, when directed by the processor/controller 100, produces a high frequency signal that is amplified by a high power amplifier 178. The high frequency signal produced by the exciter is also applied to the dual-channel receiver 104 of a beamformer for use in down-shifting the frequency spectrum of the two beams that are output by the first and second power combiners 102a, 102b so that the beams can be processed. Each of the forward and side looking transmit circuitries 174a, 174b also include a switch 180 that permits the processor/controller 100 to selectively apply the high frequency signal to a power divider 182. If the processor/controller 100 sets the switch 180 so that the frequency signal is applied to the power divider 182, the power divider 182 splits the signal into a plurality of sub-signals with each sub-signal being applied to one element of the transmit array. Since the high frequency signal is also being applied to the multi-beam beamformer, the antenna system 20 is in an active configuration when the switch 180 is so set. If desired, the power divider 182 can include circuitry for steering the signal output by the transmit array, such as switches for selecting the elements to which the subsignals are applied and phase shifters. If, on the other hand, the switch 180 is not set so that the high frequency signal is applied to the power divider 182, then the high frequency signal is applied only to the dual-channel receiver 104 of the receiving beamformer. With the switch 180 set in this fashion, the antenna system 20 is a semi-active or passive configuration.

Having described the various elements of the antenna system 20, it is now appropriate to describe the operation of the antenna system 20. However, before describing the operation of the antenna system 20, various geometrical relationships between the antenna system 20, the antenna array 34, the aircraft 22, and an object 110 are described with reference to FIG. 6. For purposes of the following description, the longitudinal axis 30 of the aircraft 22 is referred to as the roll axis 112. The roll plane 114 is a plane that is substantially perpendicular to the roll axis 112 and contains any one of the transmitting or receiving arrays. An arbitrarily defined lateral axis 116 lies in the roll plane 114 and intersects the roll axis 112. The location of the object 110 is defined to be upon a line whose loci are determined by the elevation angle $\theta$ of the object with respect to the roll axis 112 and the roll plane angle $\phi$ of the object in the roll plane 114 relative to the lateral axis 116.

Operation of the antenna system 20 involves an acquisition phase in which coarse information on the position of the object 110 with respect to the aircraft 22 is obtained and a tracking phase in which high resolution or fine information is obtained on the position of the object 110 relative to the aircraft 22. With respect to either the acquisition phase or the tracking phase, the electromagnetic signal received by the antenna array 34 can be the electromagnetic signal reflected by the object 110 but originally produced by the forward looking array 26 or the side looking array 44 using, respectively, either the forward transmit circuitry 174a or the side looking transmit circuitry 174b. This would occur if, for example, the antenna system 20 is part of an active radar or similar system. Alternatively, the electromagnetic signal received by the antenna array can be the electromagnetic signal reflected by the object 110 but originally produced by another transmission source as in a semi-active radar or like device. Additionally, the electromagnetic signal received by the antenna array 34 can be the signal transmitted by the object 110. This would be the situation if, for example, the antenna system 20 is part of a passive radar or comparable device. With respect to the acquisition phase, the elevation angle $\theta$ of the object 110 is determined by using the forward looking receive array 40 to scan the angles between ±20° from the roll axis 112 and using at least one of the first side looking receive array 48 and the second side looking receive array 50 to scan between ±20°–60° relative to the roll axis 112.

When the forward looking receive array 40 is being used in the acquisition phase to scan at a particular elevational angle $\theta$ with respect to the roll axis 112, the multi-beam beamformer 74 is used to generate a single beam from the signals produced by up to eight of the forward looking elements 42 of the forward looking receive array 40 upon reception of an electromagnetic signal. Consequently, up to eight of the first switches 98a or eight of the second switches 98b are placed in an "ON" state by the processor 100 so that either the first power combiner 102a or the second power combiner 102b can produce a beam. All other switches comprising the switch array 96 are place in an "OFF" state. The single beam produced by either the first power combiner 102a or the second power combiner 102b is applied to the dual-channel receiver 104 which measures the amplitude of the beam. The forward looking receive array 40 is then used to scan a different elevational angle $\theta$ with respect to the roll axis 112 and the multi-beam beamformer 74 is used to generate another beam whose amplitude is measured by the dual-channel receiver 104. It is likewise, feasible to simply compare the first and second beams without scanning in elevation but comparing the fall-off in amplitude coverage between the overlapping beams. After the forward looking receive array 40 is used to scan between 0° and 20° relative to the roll axis 112, either the first side looking receive array 48 or the second side looking receive array 50 is used to scan the elevational angles between 20° and 60° relative to the roll axis 112 in substantially the same manner as described with respect to the forward looking receive array 40. By comparing the amplitudes at the various scan angles between 0° and 60° relative to the roll axis 112, the elevational angle $\theta$ at which the maximum amplitude beam was produced can be identified, thereby determining the coarse or rough elevational angle $\theta$ of the object 110 with respect to the aircraft 22.

As an alternative to sequential lobing, i.e., determining the elevational angle $\theta$ of the object 110 by making sequential amplitude measurements and comparing the measurements to determine the elevational angle θ at which the maximum amplitude occurs, the multi-beam beamformer 74 can be used to generate two beams at substantially the same time and then the dual-channel receiver 104 can be used to compare the amplitudes of the two beams to implement a simultaneous lobing scheme. As with the prior method for determining the angle θ, up to eight of the antenna elements can be used to generate either or both of the two beams.

In the acquisition phase, the roll plane angle φ of the object 110 is determined by scanning φ between 0° and 360° using the forward looking receive array to determine φ for objects that are located in the field of view of the forward looking receive array 40. More specifically, the multi-beam beamformer 74 is used to generate a single beam from the signals produced by up to eight of the forward looking elements 42. The single beam is then provided to the dual-channel receiver 104, which measures the amplitude of the beam. The multi-beam beamformer 74 is then used to generate a second beam from the signals produced by a second subset of the forward looking elements 42 that covers a different circumferential area than the first subset of forward looking elements 42 that were used to generate the first beam. The second beam is then applied to the dual-channel receiver 104, which measures the amplitude of the second beam. This process is repeated until the angle φ of the subset of forward looking elements 42 that produces the maximum amplitude beam can be determined. Similarly, the roll plane angle φ is determined when the object 110 is in the field of view of the side looking array 44 by scanning φ from 0° to 360° using the first side looking receive array and the second side looking receive array 50. More specifically, several column arrays 54 of the first and second side looking receive arrays 48, 50 are used to generate a first beam at a first angle φ. The switch array 96 of the multi-beam beamformer 74 is then used to define a second subset of column arrays 54 of the first and second side looking receive arrays 48 and 50 to form a second beam at a different angle φ. The second beam, like the first beam, is provided to the dual-channel receiver 104, which makes an amplitude measurement of the second beam. This process is repeated until φ has been scanned through the entire 360° area. The amplitudes of the various beams formed during the scan can then be compared to one another to identify the beam with the maximum amplitude and hence the coarse angle φ of the object 110. As an alternative to the use of sequential lobing to determine the roll plane angle φ, simultaneous lobing can also be used.

In the tracking phase, the antenna system 20 is used as a wide baseline interferometer to obtain fine or high resolution information on the position of an object relative to the aircraft 22. More specifically, the antenna system 20 is used to generate two spatially independent, overlapping beams whose phase relationship is compared to realize high resolution data on the position of an object relative to the aircraft 22. The antenna system 20 permits the baseline or aperture of the antenna array 34 to be altered so that ambiguities in the data relating to the position of an object can be resolved. Further, the antenna system 20 permits the beamwidth of the two beams produced by the antenna system to be altered so that a focused or high gain beam can be produced in the direction of the object.

As with the acquisition phase, the tracking phase can be divided into a forward tracking phase in which the forward looking array 35 is utilized and a side tracking phase in the side looking array 44 is employed. In the forward tracking phase, a first subset of the forward looking elements 42 of the forward looking receive array 40 and a second subset of the forward looking elements 42 of the forward looking receive array 40 that is diametrically opposed to the first subset are used by the beamformer 74 to substantially simultaneously generate the two beams that are phase compared to realize an interferometer that provides high resolution data on the position of the object 110.

With the foregoing background in mind, the various geometrical relationships between the roll axis 112, the roll plane 114 in which the forward looking receive array 40 is located, and an object 110 are defined with reference to FIGS. 7A and 7B. As before, the elevational angle θ is the angle of the object 110 relative to the roll axis 112. The roll angle φ is the angle of the object 110 in the roll plane 114 relative to a plane defined by the roll axis 112 and a lateral axis that extends between the midpoints of the two subsets of the forward looking receive array 40. The lateral axis will hereinafter be referred to as the antenna axis 122. Further, the two subsets used to form the two beams are identified in FIG. 7B as the first antenna subset 124a and the second antenna 124b. When the roll angle φ of the object 110 equals 0°, the object 110 lies in the plane defined by the antenna axis and the roll axis. This particular plane will be referred to as the in-plane. When the roll angle φ of the object 110 equals 90°, the plane defined by the object and the roll axis 112 is orthogonal to the plane defined by the antenna axis 122 and the roll axis 112. This plane will be referred to hereinafter as the cross-plane. With the foregoing definitions in mind, the phase difference between a signal produced by the object 110 that is received by the first antenna subset 124a and the second antenna subset 124b is defined by the following equation:

$$\Delta = d (\sin \theta)(\cos \phi) 2\pi/\lambda + f(p) \qquad (1)$$

where Δ is the phase difference, d is the distance between the first antenna subset 124a and the second antenna subset 124b, θ is the elevational angle of the object, φ is the roll angle of the object, and λ is the wavelength of the received signal. The polarization factor f(p) is a function of polarization of the object and the two antenna subsets. For objects that are substantially copolarized to the antenna subsets, or antenna subsets substantially co-polarized to each other, f(p)=0. From equation (1), a phase difference of zero will be achieved when the object 110 is in the cross-plane because the cosine of 90° is zero. The cross-plane also defines the point at which the maximum error slope for the roll plane measurement φ occurs, i.e., the point at which the change in phase Δ with respect to the roll angle φ is greatest and therefore maximum resolution is obtained. Conversely, the in-plane defines the point at which the maximum error slope for the elevational angle θ occurs, i.e., the point at which the change in phase Δ with respect to elevational angle θ is greatest. However, it has been found that the error slope at 70° off the in-plane or 20° from the cross-plane is still quite high and provides sufficiently high resolution in many instances.

Figure 8:
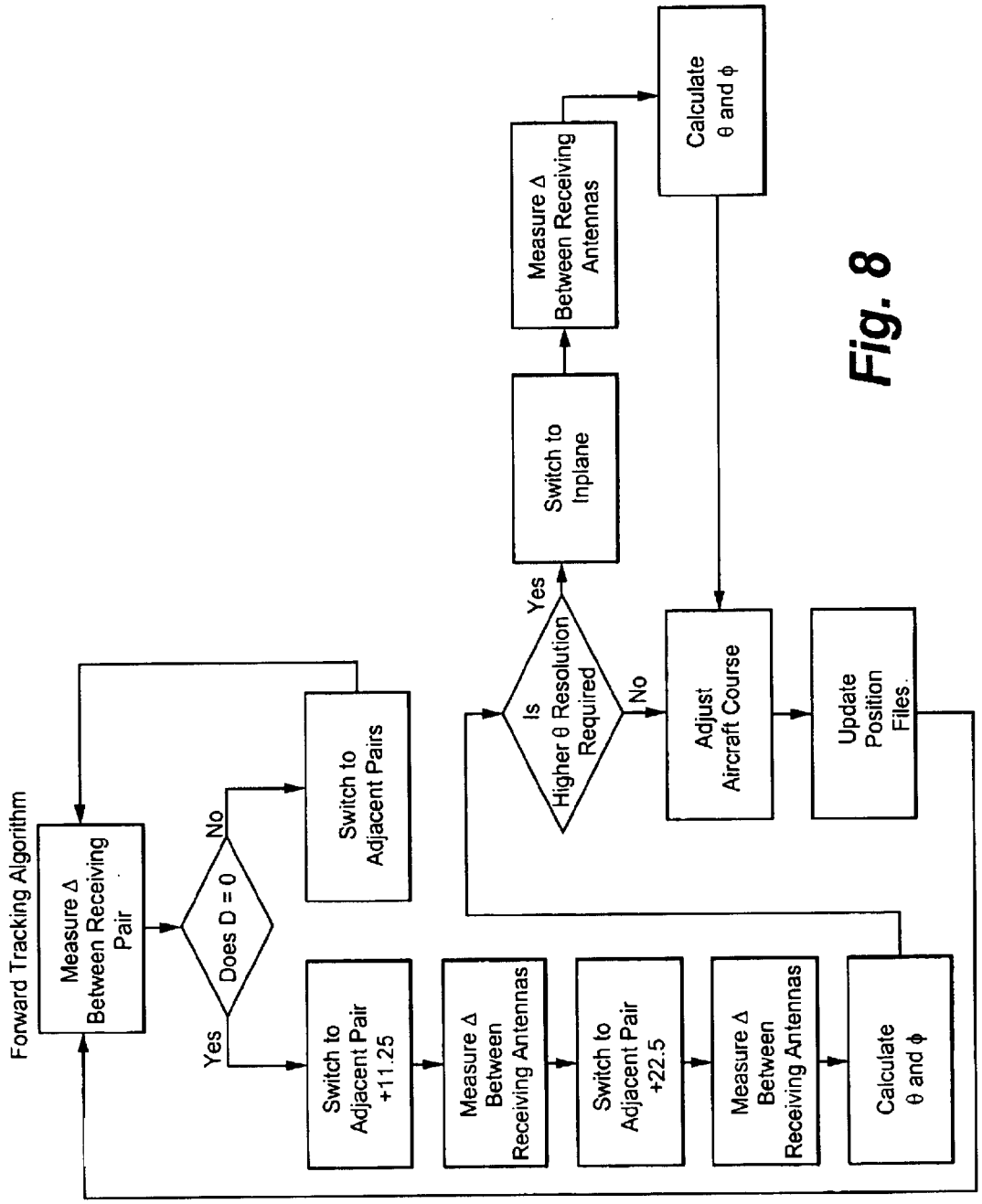
FIG. 8 is a flow chart that illustrates the process used to determine fine resolution data when the forward looking receive array is in use.

Consequently, the elevational angle θ and the roll plane angle φ of an object relative to the aircraft 22 can be determined by measuring the phase difference Δ between pairs of beams that are substantially simultaneously produced by the multi-beam beamformer 74 from different subsets of the forward looking elements 42 of the forward looking receive array 40 located between ±20° with respect to the cross-plane. More specifically, and with reference to FIG. 8, forward looking tracking is commenced by the processor 100 selecting which of the forward looking elements 42 or which of the signals produced by the forward looking elements are to be used to generate the two spatially independent, overlapping beams whose phase is later compared by the dual-channel receiver 104. As previously mentioned, the selected forward looking elements 42 are located on opposite sides of the roll axis 112 with respect to one another.

Once the first subset 124a and the second 124b of the forward looking elements 42 of the forward looking receive array 40 have been selected, the beamformer 74 operates to substantially simultaneously produce a first beam and a spatially independent but overlapping second beam that are applied to the dual-channel receiver 104. The dual-channel receiver 104 then measures the phase difference between the first and second beams. If the phase difference Δ is not zero, then the cross-plane has not been located and the processor 100 uses the switch array 96 to select a new first subset 124a and a new second subset 124b of the forward looking elements 42 of the forward looking receive array 40 for generating the first and second beams. This process is repeated until the cross-plane is located.

Once the cross-plane is located, the processor 100 causes the switch array 96 to select the signals produced by the two forward looking elements 42 that are adjacent to the two forward looking elements that were used to identify the cross-plane to produce two new spatially independent but overlapping beams. In effect, the switch array has been used to electronically roll the two beams about the roll axis 112 or, stated differently, change the aperture of the antenna elements used to generate the two beams. The phase difference Δ between this new pair of beams is then measured by the dual-channel receiver 104 and stored. The processor 100 then uses the switch array 96 to select the next two adjacent forward looking elements 42 for generating two new spatially independent, overlapping beams. These two beams will be approximately 22.5° off the cross-plane, which is further than necessary to obtain sufficient resolution of the elevational angle θ. The phase difference between the two new spatially independent, overlapping beams is measured by the dual-channel receiver 104 and stored. The dual-channel receiver 104 can then use the three phase measurements, the one at the cross-plane, the one at the first adjacent pair, and the one at the second adjacent pair, to determine the elevational angle θ and the roll plane angle φ of the object 110 relative to the aircraft 22.

If higher resolution of the elevational angle measurement is needed, the processor 100 can use the switch array 96 to select first and second subsets 124a, 124b of the forward looking elements 42 in the forward looking receive array 40 that are in the in-plane, which is the location at which the maximum error slope and resolution for θ exists.

After the elevational angle θ and the roll plane angle φ have been determined, the position of the aircraft 22 can be corrected and the positional relationship between the aircraft 22 and the object 110 updated. The process of then locating the cross-plane, measuring the phase difference by dithering the selected forward looking elements 42 about the cross-plane, using the different phase measurements to determine the elevational angle θ and roll plane angle φ, and, if necessary, determining the elevational angle θ to a greater degree by performing an in-plane measurement, is then repeated.

Figures 9A, 9B:
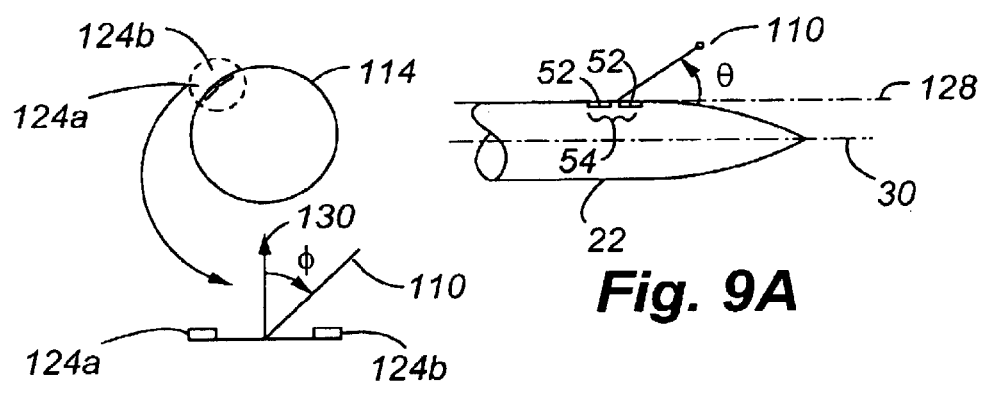
FIGS. 9A and 9B illustrate the geometrical or positional relationship between the aircraft shown in FIG. 1 and an object in the space surrounding the aircraft when the side looking receive array is being used to obtain fine resolution data.

When the first and second side looking receive arrays 48, 50 are used in the tracking phase, the antenna system 20 operates to generate two spatially independent and overlapping beams from the receive array whose phase can be compared to implement an interferometer that provides high resolution information on the position of an object relative to the aircraft 22. Before describing the side looking tracking phase, the geometric relationships between the aircraft 22, the first and second side looking receive arrays 48, 50, and/or column arrays 52, and the object 110 are described because they are somewhat different than those associated with the forward looking tracking. Specifically, and with reference to FIGS. 9A and 9B, the elevational angle θ of an object 110 is the angle relative to a column axis 128 of a column array 54 measured relative to the midpoint between the two side looking elements 52 comprising the column array 54. The roll plane angle φ is the angle between the object and an axis that is perpendicular to the midpoint of a line extending between the two subsets of the side looking receive array that is used to measure φ.

The phase relationship with respect to the roll plane angle φ between a signal that is received by the first subset 124a and the second subset 124b is defined by the following:

$$\Delta = d(\sin\phi)2\pi/\lambda + f(p) \qquad (2)$$

where Δ is the phase difference, d is the distance between the midpoints of the first and second subsets 124a, 124b, φ is the roll plane angle, and λ is the wavelength of the signal.

The phase relationship with respect to the elevational angle θ between the signals received by the two side looking elements comprising the column array 54 is defined by the following:

$$\Delta = d(\cos\theta)2\pi/\lambda + f(p) \qquad (3)$$

where Δ is the phase difference, d is the distance between the two elements comprising the column array 54, θ is the elevational angle, and λ is the wavelength of the signal received by the two side looking elements of the column array 54.

With respect to equations (1), (2), and (3), it should also be appreciated that by increasing the frequency of the signal, which decreases the wavelength λ, the phase difference Δ can be increased. The phase difference Δ can also be increased by increasing the distance d between the antenna elements.

Figure 10:
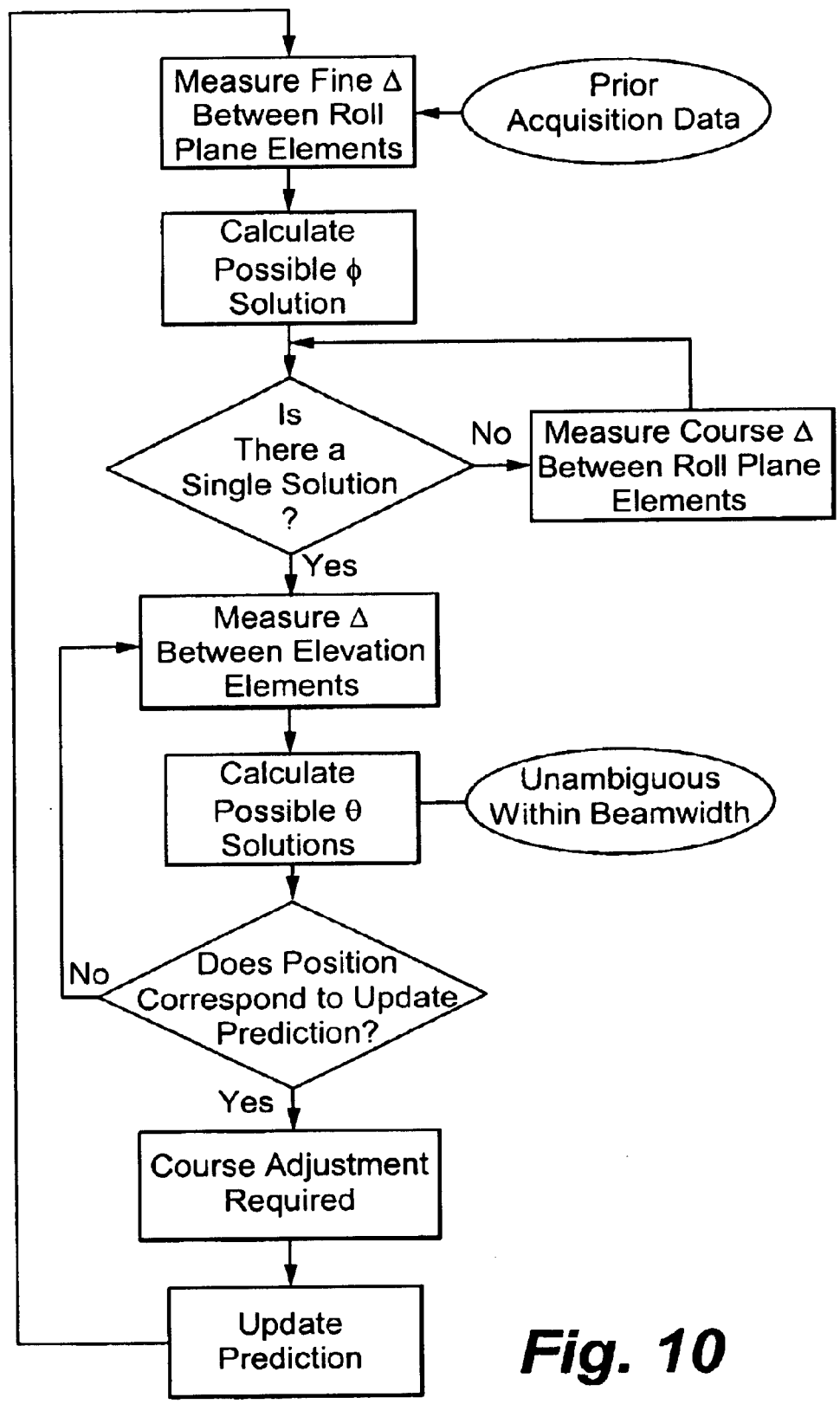
FIG. 10 is a flow chart that shows the process used to determine fine resolution data when the side looking receive array is in use.

Based upon equations (2) and (3) and with reference to FIG. 10, the antenna system 20 commences the determination of the roll plane angle φ of the object 110 by using the processor 100 to select the first and second subsets 124a and 124b of the side looking antenna elements 52 of either the first side looking receive array 48 or the second side looking receive array 50 that are to be used to form two spatially independent but overlapping beams. Once the first and second subsets 124a, 124b have been selected, the multi-beam beamformer 74 then forms the two spatially independent, overlapping beams and provides the two beams to the dual-channel receiver 104. The dual-channel receiver 104, in response, determines the phase difference Δ between the two signals and then uses equation (2) to calculate the roll plane angle φ. There is a possibility that there may be more than two possible roll plane angles that satisfy equation (2). If this is the case, then the processor 100 changes the baseline between the first and second subsets 124a, 124b by selecting new first and second subsets 124a, 124b for use in forming the two beams. After the new first and second subsets 124a, 124b have been selected, the multi-beam beamformer 74 again forms the two spatially independent, overlapping beams and provides them to the dual-channel receiver 104. The dual-channel receiver 104 again determines the phase difference Δ between the two beams and calculates the roll plane angle φ. The second calculation of the roll plane angle φ provides sufficient information to determine which of the two initially calculated phase plane angles φ is the correct angle.

After the roll plane angle φ has been determined, determination of the elevational angle θ by the antenna system 20 commences with the processor 100 selecting at least one side looking element 52 of the side looking receive array 48 and the signal produced by at least one side looking element 52 of the second side looking receive array 50 for use in forming the two spatially independent, overlapping beams. After the selection, the multi-beam beamformer 74 generates the two spatially independent, overlapping beams from the selected signals and provides the two beams to the dual-channel receiver 104. The dual-channel receiver 104 then measures the phase difference Δ between the two beams and then determines the two possible solutions for the elevational angle θ. If both of the possible solutions for the elevational angle θ are outside a predicted value for the elevational angle θ determined during the acquisition phase, then the measurement of the phase difference θ is repeated. This process continues until at least one of the possible elevational angles θ is within the predicted range. Once the elevational angle θ is resolved, the course of the aircraft 22 is adjusted, if required, and the locational information on the object 110 is updated. The process illustrated in FIG. 10 is then repeated.

Figure 11:
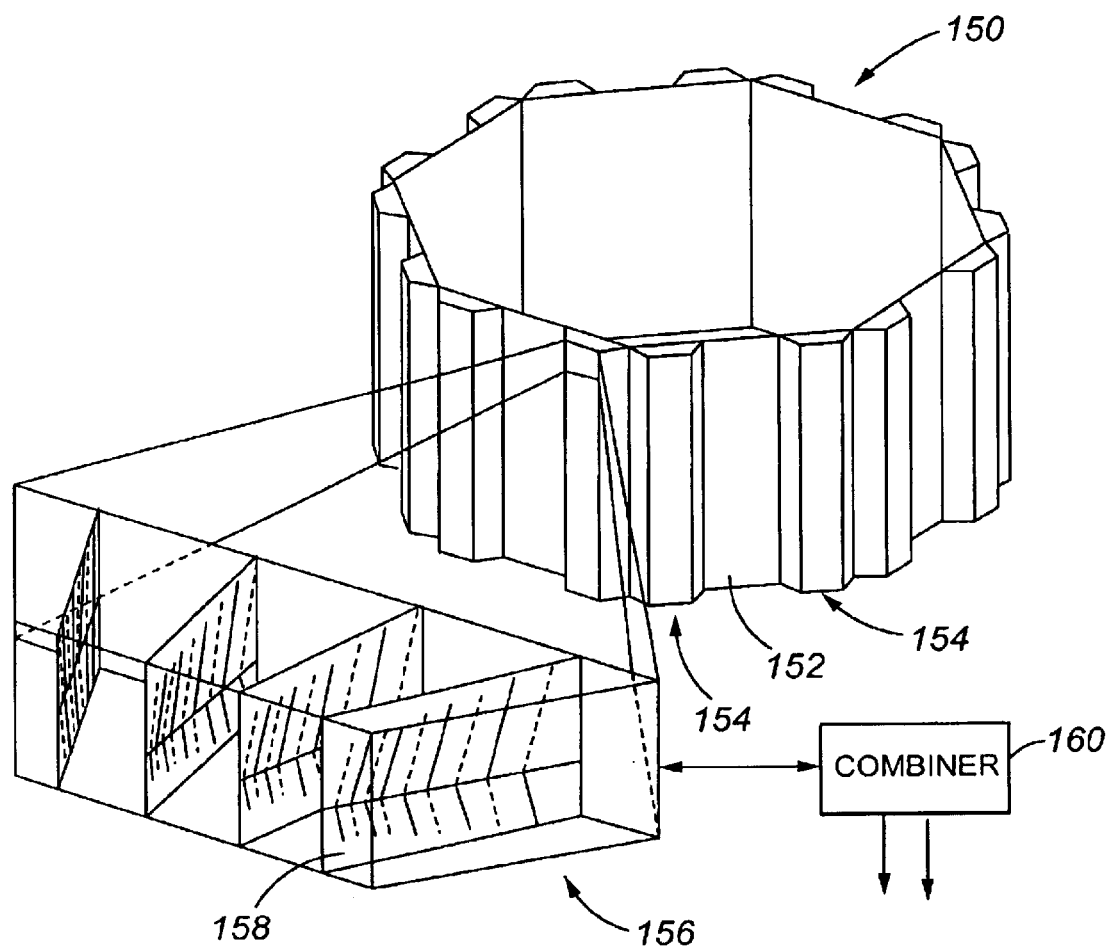
FIG. 11 illustrates a second embodiment of the antenna system of the present invention in which the antenna system forms part of a transponder system in which the antenna system is useful in reducing the possibility of signals being transmitted or received by the antenna from being intercepted and includes a plurality of facets, a plurality of asymmetric log period dipole elements that are arranged into subarrays that are, in turn, arranged into column arrays, with two column arrays located on each facet.
Figure 12:
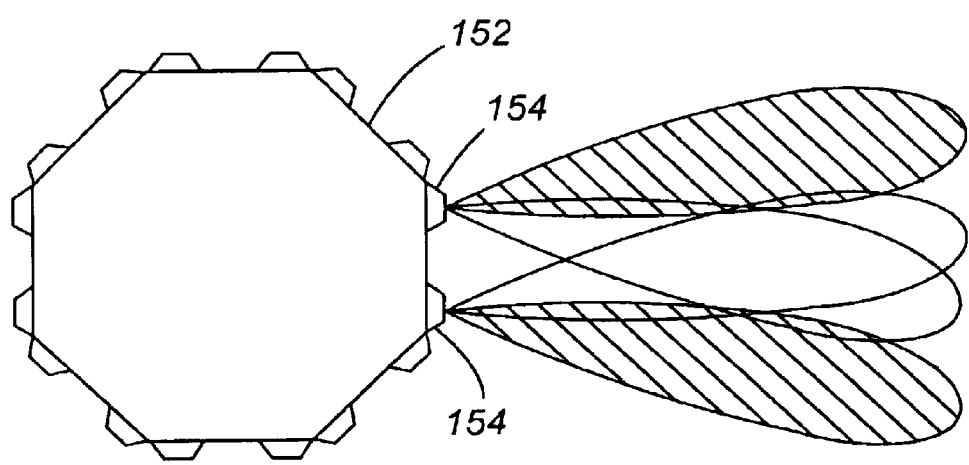
FIG. 12 illustrates the two beam directions associated with each of the column arrays on a single facet.

With reference to FIG. 11, a second embodiment of the antenna system 20 is illustrated. This embodiment of the antenna system 20 is useful in reducing the possibility of the signals that are being transmitted or received by the antenna system being intercepted and is also capable of being used in low SNR environments. The antenna system 20 includes a surface 150 that is comprised of eight facets 152 that each support a portion of the antenna array. More specifically, each facet 152 supports two column arrays 154 that are separated from one another. Each of the column arrays 154 is comprised of a plurality of vertically juxtaposed subarrays 156. Each subarray 156 is, in turn, comprised of four horizontally juxtaposed antenna elements 158. The antenna element 158 is a nine dipole asymmetric log periodic antenna element. The spacing between the antenna elements 158 comprising the subarray 156 is tapered in depth so that a frequency-independent azimuth beamwidth is realized across the frequency bandwidth of the antenna system 20. Further, each of the subarrays 156 provides the signal it produces to a combiner 160 that produces two symmetrical beams at ±11.25° relative to the boresite of the subarray 156 as illustrated in FIG. 12 for the subarrays 156 associated with one of the facets 152.

Figure 13:
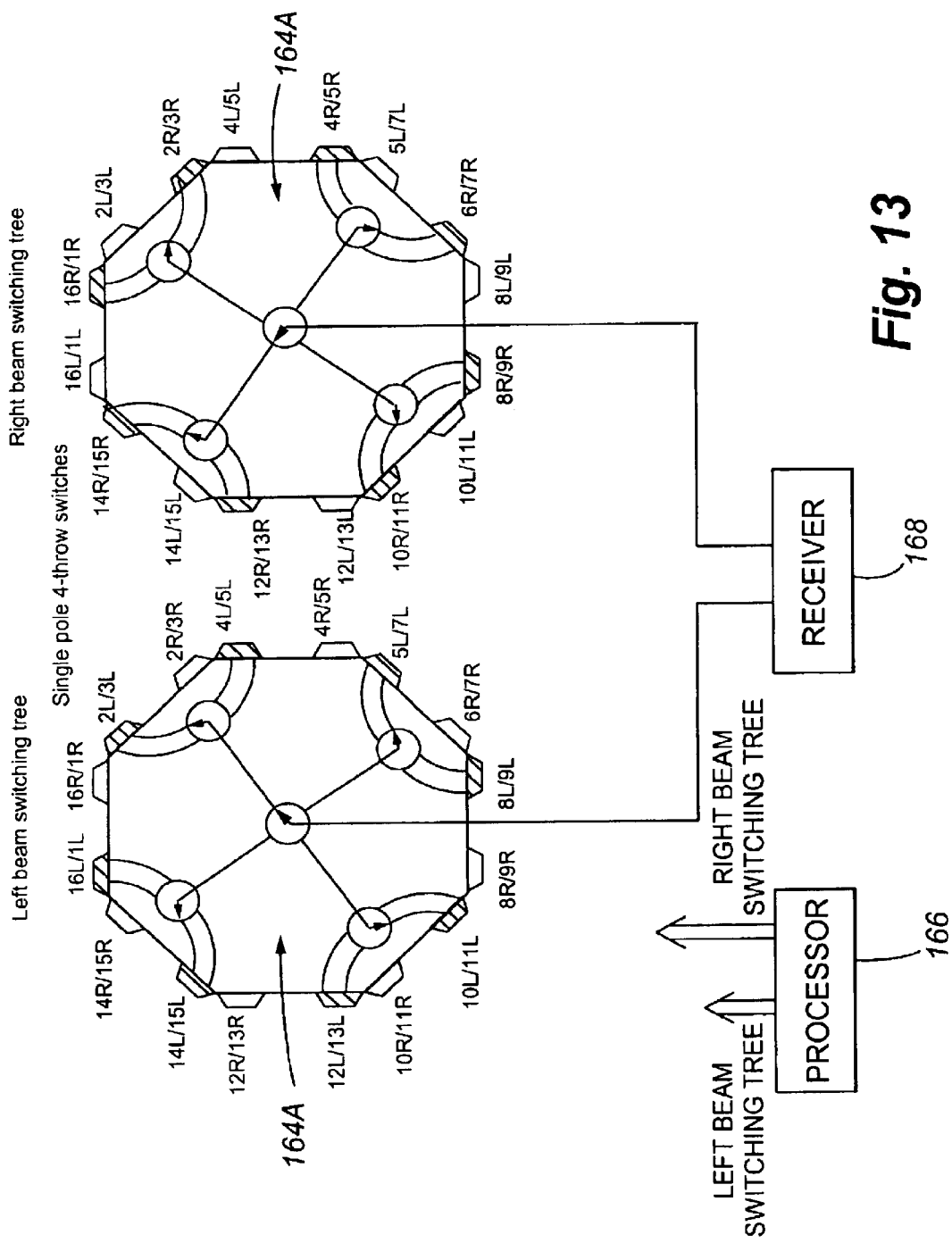
FIG. 13 illustrates the two independent switching networks used to control the antenna array.

The antenna system 20 also includes a switching network that is illustrated in FIG. 13. The switching network includes a left beam switching tree 164a that is associated with the left column array 154 of each facet 152 and a right beam switching tree 164b that is associated with the right column array 154 of each facet. Both the left beam switching tree 164a and the right beam switching tree 164b include a plurality of switches whose state, either "ON" or "OFF", is controlled by a processor 166. The processor 166 controls the switches of the left beam switching tree 164a and the right beam switching tree 164b such that one of the two beams produced by the column array 154 of one of the facets 152 that is associated with the left beam switching tree 164a and one of the two beams produced by one of the column arrays 154 of one of the facets 152 that is associated with the right beam switching tree 164b is provided to a dual-channel receiver 168. The dual-channel receiver 168 performs amplitude and phase comparisons of the two beams provided by the two switching trees that can be used to determine information on the location of an object relative to the antenna system 20.

FIG. 14 shows the switching matrix implemented by the processor 166 for accomplishing course or amplitude comparisons of the two beams provided by the switching network and the fine or phase comparison of the two beams provided by the switching network. As the switching matrix shown in FIG. 14 illustrates, there are thirty-two possible switching states; sixteen are associated with coarse or amplitude comparison, and the other sixteen are associated with fine or phase comparison.

Operation of the antenna system 20 has an acquisition phase and a tracking phase just as with the prior embodiment. As with the other embodiment, the electromagnetic signal received by the antenna can be the signal reflected by an object but originally produced by the antenna system 20 or other transmission device, or an electromagnetic signal produced by the object itself. In the acquisition phase, the processor 166 controls the switching network so that the 360° azimuth plane about the antenna system 20 is scanned and coarse or amplitude comparisons of the two spatially independent but overlapping beams defined by the table in FIG. 14 can be made. More specifically, in the acquisition phase, the processor 166 sequentially places the switching networks in the odd numbered states set forth in FIG. 14. In each state, the left beam switching tree 164a provides a first beam to the dual-channel receiver 168 and the right beam switching tree 164b provides a second beam that is spatially independent but overlapping with the first beam to the dual-channel receiver 168. The dual-channel receiver 168 performs an amplitude comparison of the two beams and stores the result of the comparison. The comparison information is then used to identify the locations of objects relative to the antenna system 20.

In the tracking phase, the processor 166 places the switching network in the even numbered states identified in FIG. 14. In each state, the left beam switching tree 164a provides a first beam to the dual-channel receiver 168 and the right beam switching tree 164b provides a second beam to the dual-channel receiver 168 that is spatially independent but overlapping with respect to the first beam to the dual-channel receiver 168. In response, the dual-channel receiver 168 performs a phase comparison of the two beams to generate fine or high resolution data on the position of an object relative to the antenna system. This process is then repeated, if necessary, for the other even numbered states defined in FIG. 14 and the comparison information generated is then used to provide high resolution information on the location of objects relative to the antenna system 20.

Once an object is located, the antenna system can be used to communicated with the object, such as an aircraft. Further, due to the highly directional or focused character of the beams, high gain of the beams, and/or low side lobes of the beams, the possibility of communications between the antenna system 20 and the object being intercepted are substantially reduced and communications can be conducted in a low SNR environment.

Figure 15:
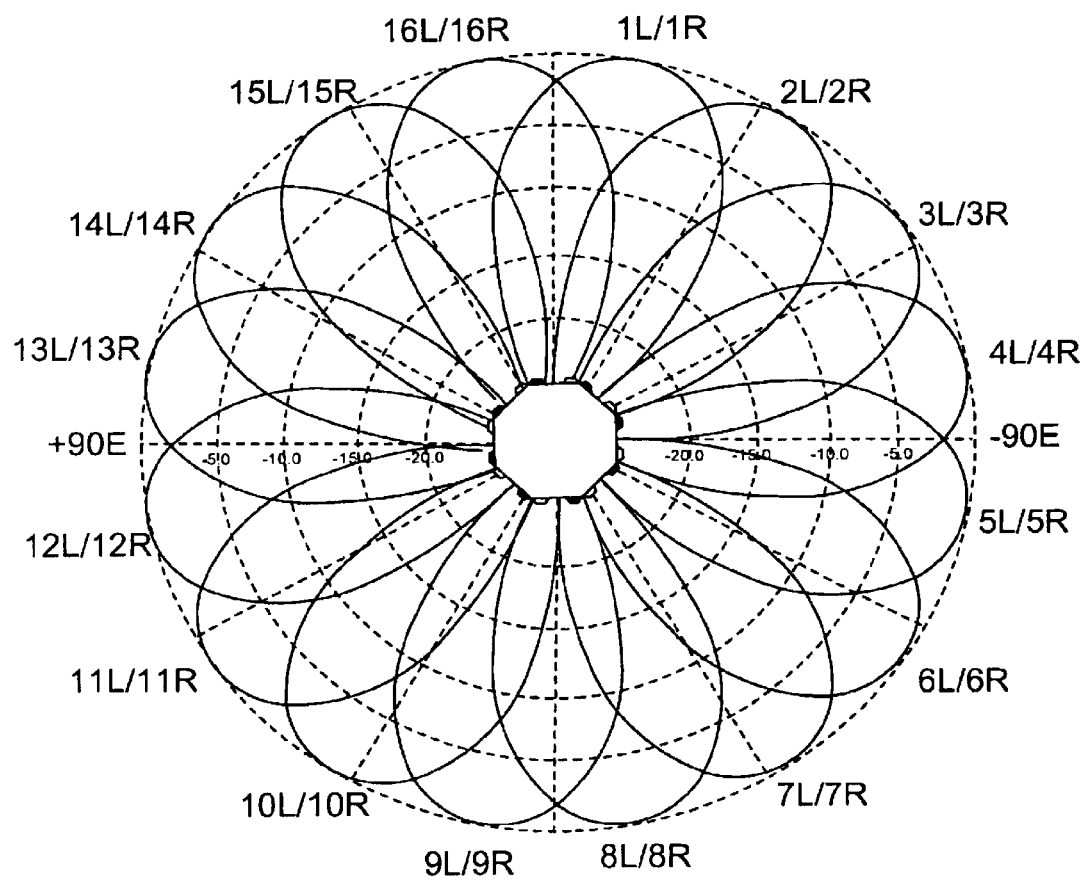
FIG. 15 illustrates all thirty-two beams that can be produced by the antenna system illustrated in FIG. 11.

FIG. 15 shows the 360° azimuth coverage provided by all thirty-two beams that can be produced by the antenna system 20 over time. Because the antenna system 20 produces pairs of overlapping beams, there appears to be only sixteen beams.

Figure 16:
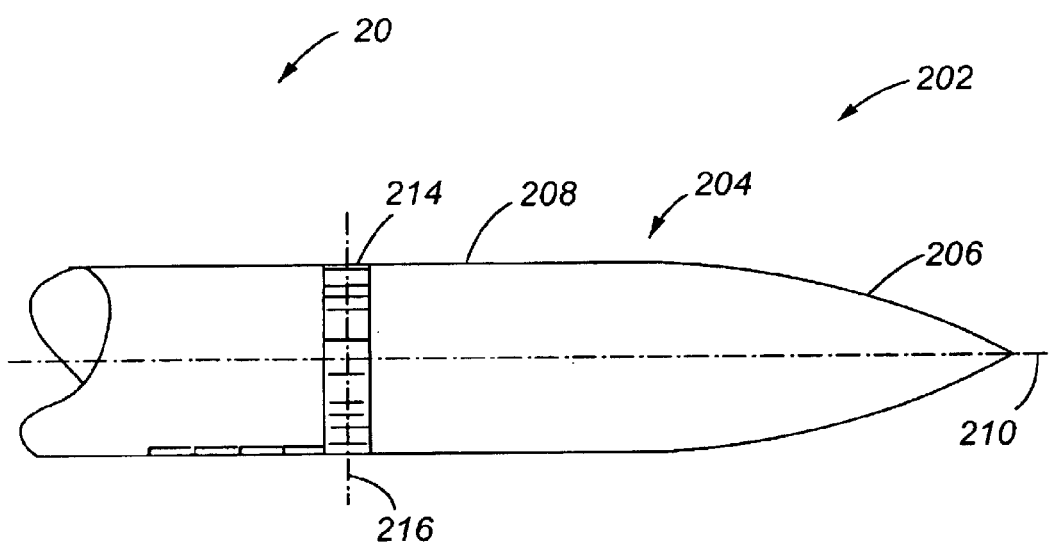
FIG. 16 illustrates a third embodiment of the antenna system of the present invention in which the antenna system forms part of a radar and includes an antenna array comprised of a single ring of broadband elements that are mounted conformal with the side of an aircraft.

FIG. 16 illustrates a third embodiment of the antenna system 20. The antenna system 20 is part of a radar that is located on an aircraft 202 which has an exterior surface 204 comprised of a front or nose surface 206, a cylindrical side surface 208, and a longitudinal axis 210 that also defines the direction of movement of the aircraft 202. To distinguish the nose surface 206 from the cylindrical side surface 208, any point on the nose surface 206 has a surface area vector that is other than perpendicular to the longitudinal axis 210 and any point on the side surface has a surface area vector that is substantially perpendicular to the longitudinal axis 210.

The antenna system 20 includes a forward-looking receive array 214 for receiving electromagnetic signals from a source in a defined field of view (FOV) and converting these electromagnetic signals into electrical signals from which beams can be formed that can be used to determine information on the source of the electromagnetic radiation, which is hereinafter referred to as the object. The forward-looking receive array 214 is comprised of a number of antenna elements that are mounted to the aircraft 202 in a plane 216 which is substantially perpendicular to the longitudinal axis 210. Moreover, the antenna elements are mounted so as to exhibit a low profile or be conformal with the adjacent side surface 208. In one embodiment, the antenna elements actually form a portion of the cylindrical side surface 208. As a consequence of mounting the antenna elements in the aforementioned fashion, the elements are also located along the circular cross-sectional line of the side surface 208. Aircraft with side surfaces having different cross-sectional shapes would, given the other mounting criteria, cause the antenna elements to be located along different cross-sectional lines. For example, if the side surface of the aircraft 202 has an elliptical cross-sectional shape rather than a circular cross-sectional shape, the elements would be mounted along an elliptical line.

The low-profile or conformal mounting of the elements comprising the forward-looking receive array 214 on the cylindrical side surface 208 has, as previously mentioned, a number of benefits. Just to reiterate, the low-profile or is conformal mounting reduces adverse affects of the forward-looking receive array 214 upon the aerodynamic behavior of the aircraft 202. The mounting of the elements of the forward-looking receive array 214 on the side surface 208 permits the space interior to the array and/or the space between the forward-looking receive array 214 and the nose surface 206 to be used to accommodate or house other types of sensors that can be used as alternatives to, or to supplement the antenna system 20. In addition the low-profile or conformal mounting of the elements comprising the array 214 on the side surface 208 protects the array 214 from high temperatures existing at the nose surface 206 when the aircraft 202 is moving at high velocities.

Since the forward-looking receive array 214 in the embodiment of the antenna system 20 illustrated in FIG. 16 is only used to receive electromagnetic signals, the antenna system 20 can only be used in a passive or semi-active radar system. If required the system 20 and the forward-looking receive array 214 can be modified for use in a pulsed active radar system in which the present forward-looking receive array 214 is modified so that it transmits electromagnetic signals during a first time period and receives electromagnetic signals during a subsequent second time period. Likewise, the system 20 and the forward-looking receive array 214 can be modified for use with a continuous radar system in which a separate array is used to continually transmit electromagnetic signals and the forward-looking receive array 214 is used to continuously receive electromagnetic signals in the field of view.

At least some of the elements and preferably all of the elements comprising the forward-looking receive array 214 are broadband or broad beam elements that permit a fewer number of elements to be used to form the forward-looking receive array when compared to the forward-looking receive array 40 of the embodiment of the antenna system 20 illustrated in FIG. 1. FIGS. 17A and 17B illustrate a broadband element 220 that has an endfire pattern which makes possible a forward field of view when the broadband element 220 is mounted with a low-profile or conformal relative to the side surface 208 of the aircraft 202. The broadband element 220 employs a printed circuit feed that is a modified microstrip line which tapers in two dimensions to support a surface wave mode of operation. A further description of the broadband element 220 can be found in U.S. Pat. No. 4,931,808 which is hereby incorporated by reference. The forward-looking element 42 illustrated in FIG. 4 is also capable of broadband operation by suitably structuring the high power wave guide feed 56. As previously mentioned, the forward-looking element 42 utilizes a wave guide feed.

Both of the broadband element 220 illustrated in FIG. 17 and the forward-looking element 42 illustrated in FIG. 4 are capable of receiving radially polarized signals and circumferentially polarized signals. A radially polarized signal will have a pattern peak about the longitudinal axis 210 of the aircraft while a circumferentially polarized signal will have a peak displaced from the longitudinal axis 210 of the aircraft 202 and a pattern minima formed substantially on the longitudinal axis 210 of the aircraft 202. Of course, if the forward-looking receive array 214 should be modified to transmit signals as well as receive signals, the broadband element 220 and the forward-looking element 42 are also capable of launching both radially and circumferentially polarized signals.

Figure 18:
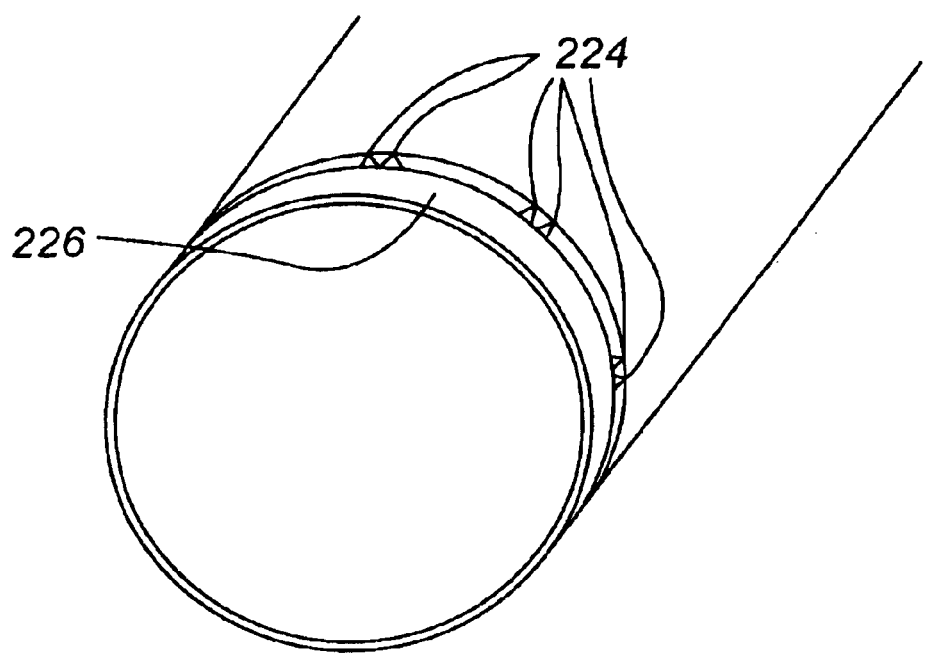
FIG. 18 is a cross-sectional perspective of an antenna array comprised of a single lens and multiple feeds.

There are a number of ways in which the elements comprising the forward-looking receive array 214 can be realized. The forward-looking receive array can be comprised of a number of elements in which each element has a separate feed and a separate radiating structure. As, for example, exhibited by the elements illustrated in FIGS. 4 and 17. With reference to FIG. 18, the forward-looking receive array can also be comprised of a number of elements with each element having a separate feed structure 224 but sharing a single radiating structure 226 with the other elements comprising the array. Further, the forward-looking receive array can be a hybrid structure comprised of a number of elements that each have a separate feed structure but share a common radiating structure and at least one element that has a separate feed and radiating structure from the other elements comprising the array.

As previously mentioned, the use of broadband elements permits fewer elements to be used for the forward-looking receive array 214 than are used for the forward-looking receive array 40 of the antenna system illustrated in FIG. 1. Since the forward-looking receive array 40 of the embodiment illustrated in FIG. 1 is comprised of thirty two elements with little, if any, space between the elements, the broadband elements comprising the array 214 includes elements that can be spaced from one another. This spacing or configuration must be such that usable amplitude and phase information on an object located in the field of view of the antenna system 20 can be obtained. In this regard, the configuration of elements must be capable of processing linearly or circularly polarized signals from an object in a defined field of view and must also provide for unambiguous phase measurements.

Figure 19:
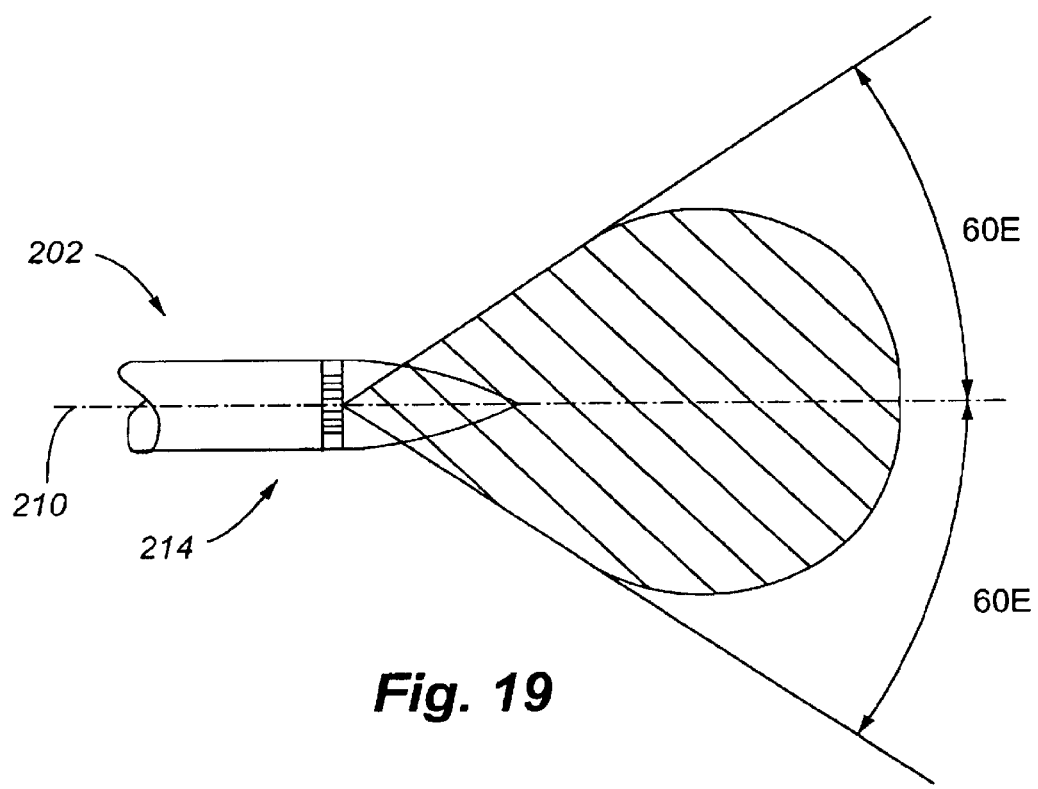
FIG. 19 illustrates the ±60° field of view relative to the longitudinal axis of the aircraft for each element comprising the antenna array.
Figure 20:
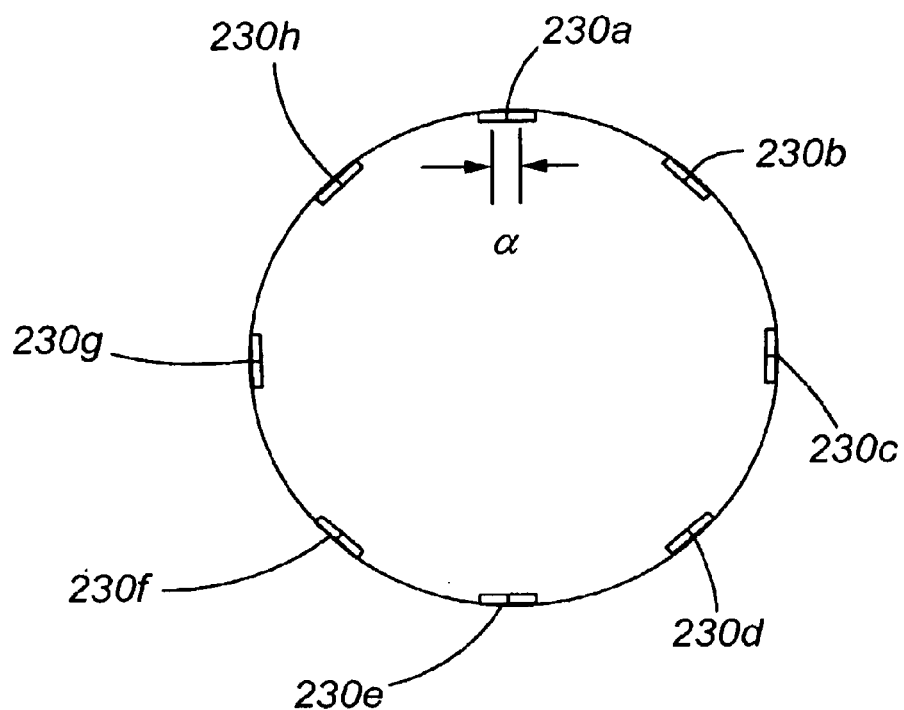
FIG. 20 is a cross-sectional view of an antenna array comprised of eight discrete pair of elements that are equally spaced from one another.

With reference to FIGS. 19 and 20, one configuration of elements for the forward-looking receive array 214 that is capable of receiving linearly or circularly polarized electromagnetic signals in a field of view of plus or minus 60° relative to the longitudinal axis 210 of the aircraft 202 and facilitating unambiguous phase measurements is comprised of eight pair of elements 230a–230f. The array 214 can be designed to have other fields of view if required by the application. Each of the eight pair of elements 230a–230f is substantially equally spaced or distanced from the immediately adjacent pair of elements. Spacing between the elements comprising each pair is chosen so that an unambiguous phase difference measurement between two beams subsequently produced using the signals provided by the two elements comprising the pair can be made. The element spacing at the highest frequency of operation is determined using the following equation:

$$d \sin \theta \cos \phi = \Delta \qquad (4)$$

where $\theta$ is the maximum elevational angle off of the longitudinal axis 210 in the defined field of view, $\phi$ is the roll plane or azimuth angle, and $\Delta$ is the change in phase between the electromagnetic signals received by the two elements comprising the pair. For the case in which $\theta$ equals 40°, $\phi$ equals ±180° for broad amplitude coverage, and $\Delta$ equals ±180°, the distance between the elements comprising the pair of elements 0.78$\lambda$ for unambiguous phase measurements (where $\lambda$ is the wavelength of the highest frequency signal expected to be received by the elements comprising the array 214).

Figure 21:
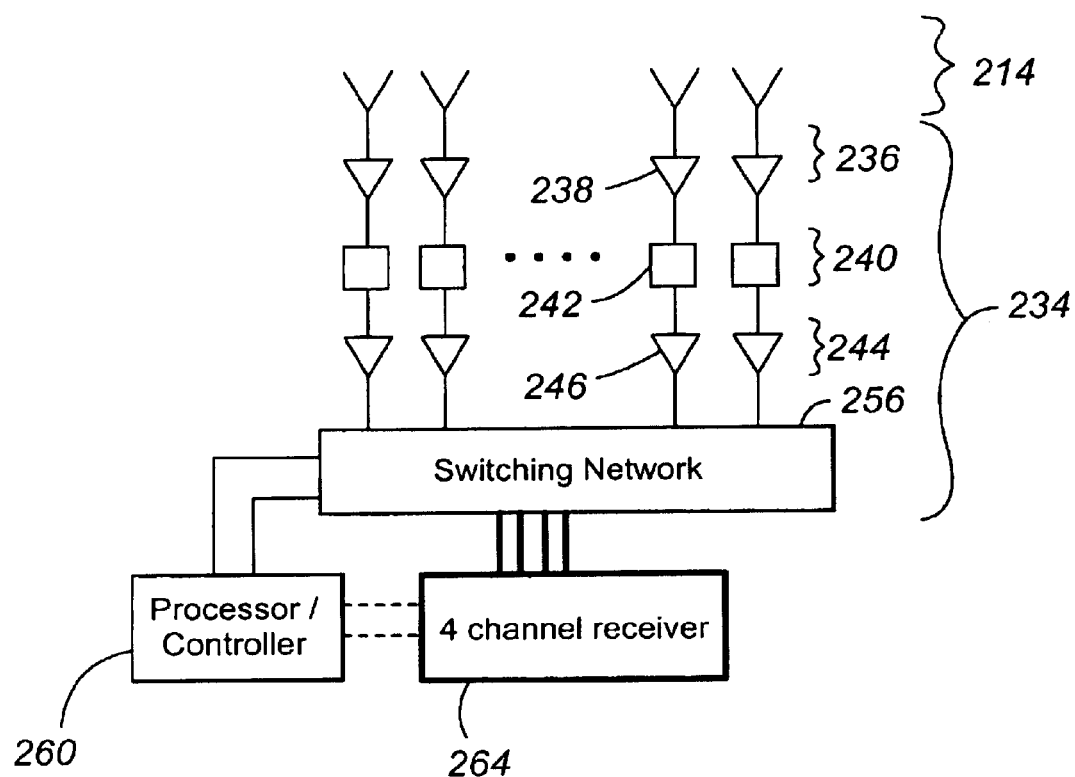
FIG. 21 illustrates a four channel beamformer.

With reference to FIG. 21, the antenna system 20 includes a 4-channel beamformer 234 (which has been simplified relative to the beamformer 74 of FIG. 5A) for processing the electrical signals received by the array 214 and that are, in turn, used to determine the values of various parameters associated with an object in the field of view of the array 214.

The beamformer 234 includes a first low noise amplifier array 236 for amplifying the signals provided by the forward-looking receive array 214 while also establishing a low noise figure and maintaining signal linearity over a wide dynamic range. The first low noise amplifier array 236 is comprised of a plurality of single stage gallium arsenide (GaAs) field-effect transistor (FET) amplifiers 238, one of which is associated with each of the elements comprising the array 214.

The four-channel beamformer 234 further includes a filter array 240 for processing the amplified signals produced by the low noise amplifier array 236 to eliminate signals outside of the band of interest. The filter array 240 is comprised of a plurality of band pass filters 242, one of which is associated with each of the elements comprising the forward-looking receive array 214.

Also included in the four-channel beamformer 234 is a second low noise amplifier array 244 for amplifying the signals output by the filter array 240 so that degradation in the noise figure due to losses in the subsequent processing circuitry is reduced. The second low noise amplifier 244 is comprised of a plurality of amplifiers 246, one of which is associated with each of the elements comprising the forward-looking receive array 214.

The four-channel beamformer 234 further includes a switching network 256 made up of a plurality of switches that are used to choose which signals output by the elements of array 214 will be provided to a four-channel receiver. In this simplified version of system 20, the switching network 256 operates so that the signal output by a single element is used to produce a single beam with no further combining or phase shifting required.

A processor 260 is included in the 4-channel beamformer 234 to define the state of the switches comprising the switching network 256. The processor 260, in the illustrated embodiment, operates so that each of the four beams is formed from the signal produced by only one of the elements of the array 214.

In a conformal radially polarized array as implemented in this embodiment, each element does not have the same coverage or polarization within the field of view as in the case when elements are implemented with broadside patterns with polarization and coverage close to similar for all mounting locations. It is therefore necessary to choose the elements to be used for direction finding interferometry based on characteristics of the signal received by the elements. The ability to selectively switch between elements in the array 214 for phase and amplitude comparison is provided by the processor 260.

The antenna system 20 further includes a four-channel receiver 264 for cooperatively processing the first, second, third and fourth beams output by the four-channel beamformer 234 to provide information relating to an object in the field of view of the array 214. More specifically the four-channel receiver 264 can measure the difference between the times of arrival of beams (i.e., measure phase differences) to realize an interferometer that provides fine or high resolution data on the object. Additionally, the four channel receiver 264 can perform an amplitude comparison of the beams to generate course data relating to the location of the object.

Before describing the operation of the antenna system 20 illustrated in FIGS. 16–21, the consequences of using the forward-looking receive array 214 comprised of broadband, radially oriented elements, which have distinctive phase and amplitude characteristics in space based on their orientation, are discussed. Specifically, in order to perform direction finding interferometry in this case over the entire field of view, it is necessary to vary the choice of element selection and baseline using the switching network under the control of the processor 260 based upon the distinct polarization responses of the elements comprising the array 214. The polarization response of a radially oriented element to an incoming wave of arbitrary polarization can be described by a radial polarization response and a circumferential polarization response.

Figure 21A:
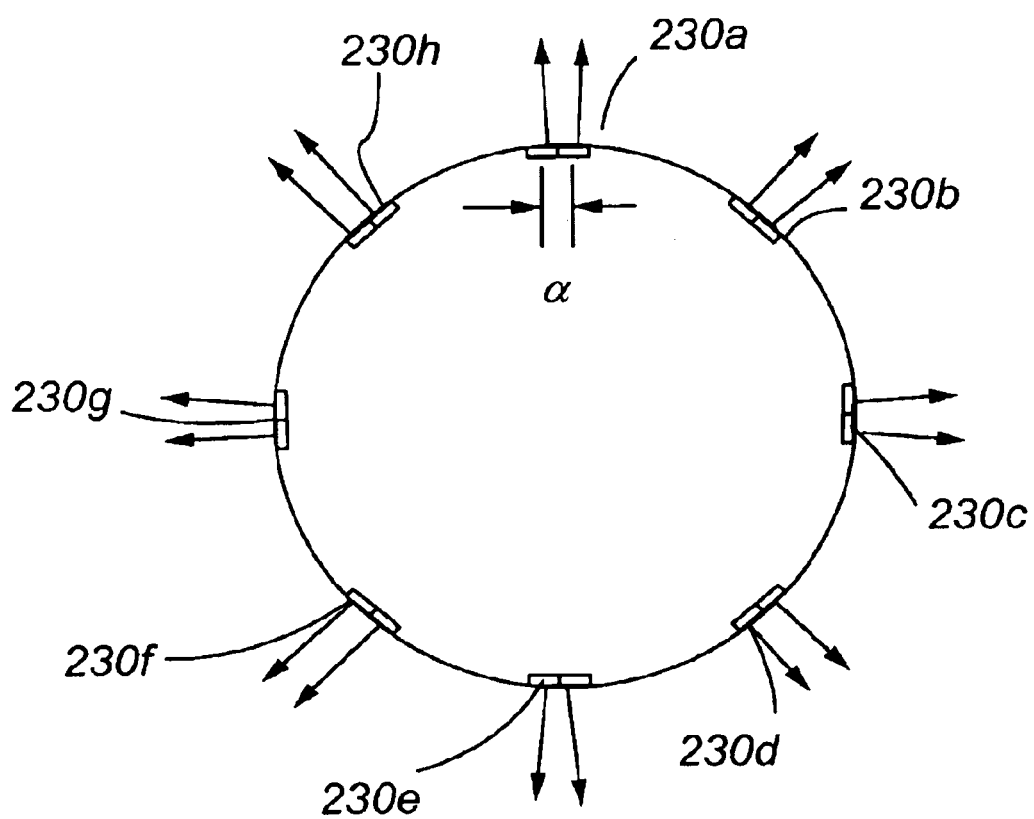
FIG. 21A illustrates the radial polarization vectors associated with antenna elements that are purely radially polarized.

In the limited case of a purely radially polarized element, it can be seen from FIG. 21A that the direction of each element's polarization vector will vary with the location of the element around the ring. The total phase response $\psi_n$ of the $n^{th}$ element to an incoming signal can be described by the sum of the angle of arrival phase ($\psi_{AOA}$) and the offset due to polarization for the nth element ($\psi_{npol}$)

$$\psi_n = \psi_{nAOA} + \psi_{npol}. \qquad (5)$$

In the case of a purely radially polarized element $$\psi_{nAOA} = kR_o \cos(\phi - \phi_n) \sin\Theta, \text{ and} \qquad (6)$$

$$\psi_{npol} = \operatorname{atan}\left[\frac{\sin(\phi - \phi_n)\sin\gamma_T \sin\delta_T}{\sin(\phi - \phi_n)\sin\gamma_T \cos\delta_T + \cos(\phi - \phi_n)\cos\theta\cos\gamma}\right] \qquad (7)$$

where $\phi_n$ on is a known constant of element location; $\gamma_T$ and $\delta_T$ are the polarization parameters of the target or object; and $\phi$ and $\Theta$ are the location parameters of the target or object. The polarization factor f(p), as described in earlier text, is:

$$f(p) = \psi_{npol} - \psi_{mpol} \qquad (8)$$

In this case, there are four unknowns ($\gamma_t$, $\delta_t$, $\phi$ and $\Theta$) which require a solution. This requires four relative phase measurements to be made and then used by the receiver 264 to determine the unknown. The measurements can be taken simultaneously or sequentially within a time period which remains relatively static.

The use of prior information for predicting the location of the target or object increases the accuracy of the system. The use of prior information for polarization parameters of the target or object can reduce the number of relative phase measurements required during tracking. For a polarization which is primarily linear, the value of $f(p)=\psi_{npol}-\psi_{mpol} \to 0$. For a polarization which is primarily circular, f(p) reduces to a value based on the angular separation between relative phase measurements such that the number of unknowns is now reduced to $\phi$, $\ominus$ and a constant polarization offset factor, P.

In a fully dynamic environment, the system can make one of these assumptions on alternating measurements to reduce the number of relative measurements required for continuous tracking.

In the more general case, the polarization response of the radially oriented element is made up of both a radially polarized component and a circumferentially polarized component. In this case, the contribution of polarization response to the total phase received at the nth element is described as:

$$\psi_{npol} = \operatorname{atan}\left[\frac{\sin\gamma_T \, \gamma_n \, \sin(\delta_T + \delta_n)}{\cos\gamma_T \, \gamma_n \, \sin\gamma_T \, \sin\gamma_n \, \cos(\delta_T + \delta_n)}\right] \quad (9)$$

where $\gamma_n$ and $\delta_n$ are now introduced as the polarization response of the $n^{th}$ element. The extreme limit of this case requires six relative phase measurements be made by the receiver 264 and then used to solve for the six unknowns $\gamma_t$, $\delta_t$, $\phi$, $\ominus$ $\gamma_n$ and $\delta_n$. Again the measurements can be taken simultaneously or sequentially within a relatively static time period.

It is, however, preferred to simplify the number of steps to solve for a target's location. This is accomplished in two ways. Either or both of these methods can be implemented within the system.

The first way is to minimize or eliminate the offset by operating in pairs of closely spaced elements within the ring. These pairs were described for use in minimizing or eliminating ambiguities in target location information but also are used to minimize or eliminate polarization ambiguities. By using the switching network 256 and processor 260 to select the beams derived from the elements in planar or closely spaced radial pairs, the polarization responses of the elements to an object with varied polarization are close to identical such that f(p) converges to zero. The system then solves for elevation and azimuth using the information acquired from the measured phase difference between two separate pairs. This limits the resolution of the system but is adequate for mid-course information.

Figure 21B:
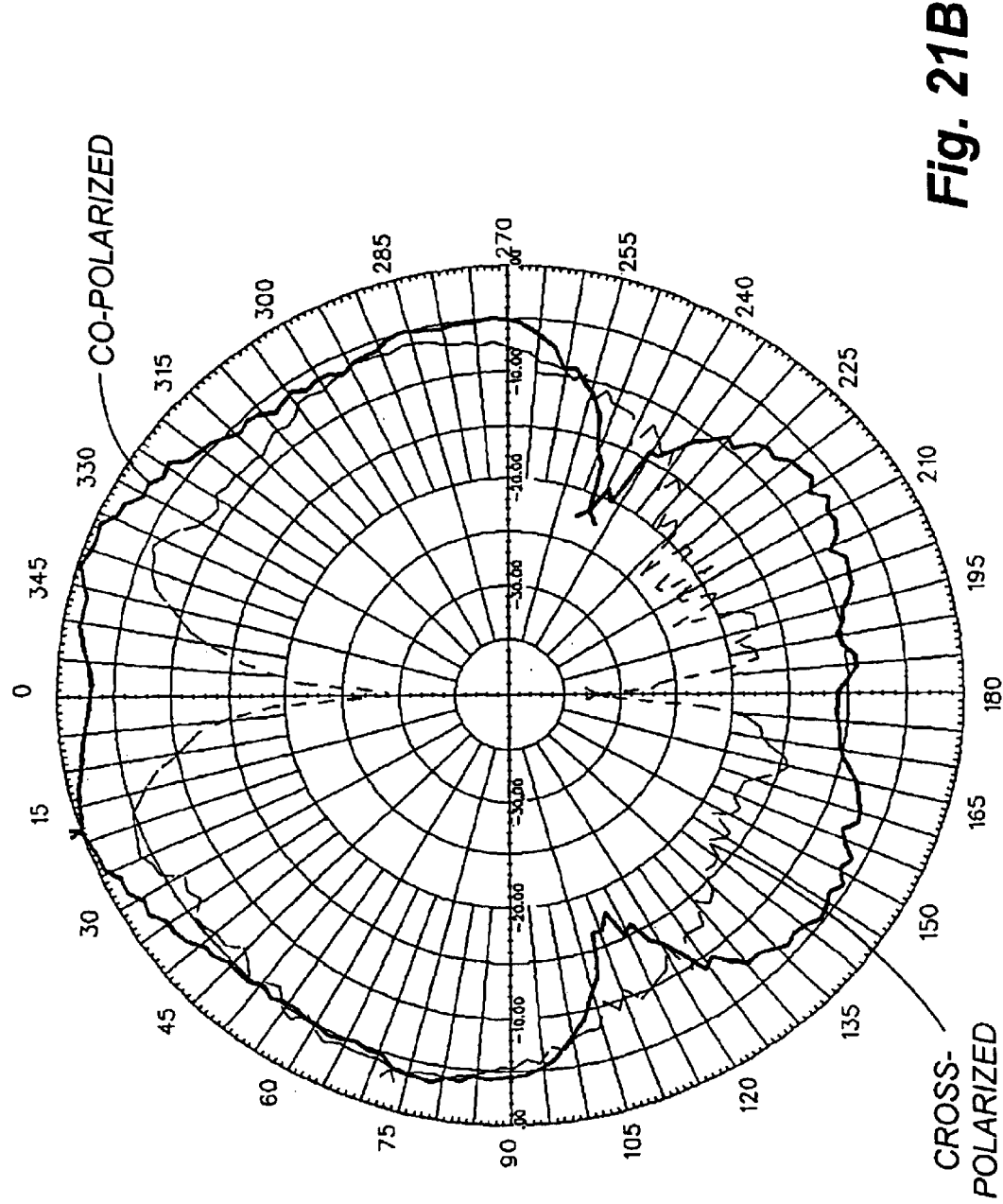
FIG. 21B illustrates the co-polarized and cross-polarized responses of the antenna element shown in FIGS. 17A and 17B.

Another option for this broad case is a look-up table for measured element polarization parameters that can be provided by the processor 260 to the receiver 264. This is simplified due to the fact that polarization response of the radial elements is almost identical for all elements with an offset for relative locations. The information is further simplified by knowing the polarization response of the element used in the preferred embodiment. The antenna element shown in FIGS. 17A and 17B has a co-polarized and cross-polarized response as seen in FIG. 21B. Note the response in amplitude to a radially polarized source. Also note the smooth response in amplitude to a cross polarized source with an on axis null. The null represents a rapid phase change on axis for the cross polarized signal. This well behaved cross polarized response enables the use of antenna elements with further radial separation for increased resolution. With the co-polarized and cross polarized responses being well behaved functions in space, there are several switching sequences which can be used to arrive at a solution. In addition, it is this well behaved co-polarized and cross polarized response that simplifies f(p) to zero for linear polarization and $f(p)=P\cdot\Phi$ for circular polarization, which can be used to simplify switching sequences even further based on proper choice of elements. As an example, for circular polarization, the constant P is solvable by using varied baselines for o in measurements. However, the sign of P changes if the elements chosen are using opposite cross polarized lobes. It is therefore important to guard against this case by choosing elements which do not experience this sign reversal, such as a group of adjacent elements.

Operation of the embodiment of the antenna system 20 illustrated in FIGS. 16–21 involves an acquisition phase in which coarse information on the position of the object with respect to the aircraft 202 is obtained and a tracking phase in which high resolution or fine information is obtained on the object relative to the aircraft. With respect to either the acquisition phase or the tracking phase, the electromagnetic signal received by the array 214 is the electromagnetic signal produced by the object or reflected by the object but originally produced by a transmitter that is not associated with the aircraft 202. Stated differently, the system 20 illustrated in FIGS. 16–21 is useful in a passive or semi-active radar system.

The acquisition phase involves generating a separate beam from the signal provided by each element of the array 214 and then comparing the amplitudes of the beams to determine the coarse location of the object in the field of view of the array 214. More specifically, determining the coarse position of the object involves, for N unknown parameter values associated with the object that are to be determined, identifying the N+1 elements with which the N+1 beams with the greatest amplitudes are associated. The N+1 elements identified as being associated with the beams having the greatest amplitudes are used in the subsequent tracking phase to generate N+1 beams that are used to determine the N unknown parameter values.

Figure 22:
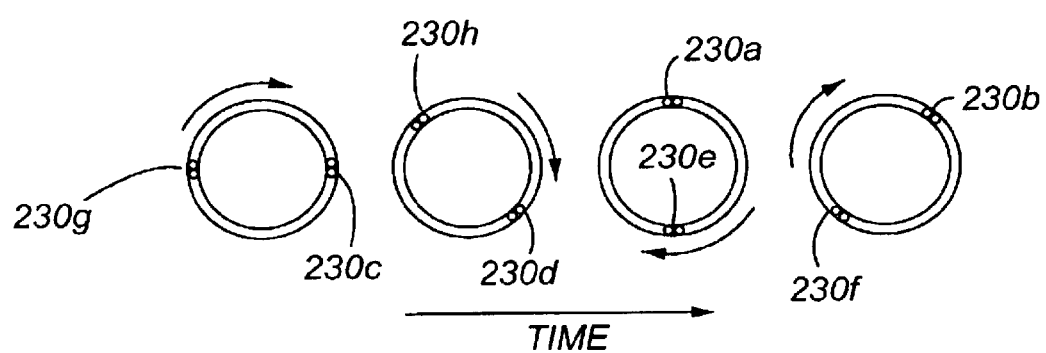
FIG. 22 illustrates a typical acquisition phase using the antenna array shown in FIG. 20.

FIG. 22 illustrates one example of the way in which the sixteen beams, one beam for each of the elements of the plurality of pair of elements 230a–h associated with the array 214 illustrated in FIG. 20, can be accomplished using a combination of simultaneous lobing in which a number of the beams are generated at substantially the same time and sequential lobing in which a number of the beams are generated at different times. More specifically, the processor 260 initially sets the switching network 256 to substantially simultaneously generate four beams from the elements associated with the pair of elements 230c and the pair of elements 230g. At a later time, after the first four beams have been formed, the controller 260 then appropriately sets the switching network 256 so that another four beams can be generated from the signals provided by the pair of elements 230d and the pair of elements 230h. Subsequently, two more sets of four beams are generated from the signals provided by the two pair of elements 230a and 230e and from the two pair of elements 230b and 230f. The four-channel receiver 264 compares the amplitudes of the sixteen beams and identifies the four beams with the greatest amplitudes and thereby identifies the four elements that will be used in the subsequent tracking phase to obtain fine or high resolution data on the object. While FIG. 22 illustrates the use of oppositely disposed pairs of elements to generate beams, the processor 260 is capable of, or can be modified to form four beams from any of the four elements in the array 214 if needed. Likewise, the processor 260 is also capable to using the four-channel beamformer 234 to generate less than four beams from less than four of the elements if so required.

The tracking phase involves generating spatially independent and overlapping beams from the signals provided by the elements identified in the acquisition phase and then comparing the phases of these beams to determine the values of parameters that are associated with the object. The elements identified in the acquisition phase as being associated with beams of greatest amplitude form a continuous group of elements, i.e., the N+1 elements are all located immediately adjacent to one another. Once the N+1 beams are formed from this group of N+1 elements and the value of 1 to N parameters determined, beams can be formed from other elements to obtain a more accurate value for one or more of the parameters.

FIGS. 23A–23D illustrate one example of the tracking phase. Prior to the tracking phase, the acquisition phase has identified the pair of elements 230h and the pair of elements 230a as being the four elements associated with the four beams of the sixteen beams produced during the acquisition phase that have the greatest amplitude. The tracking phase commences with the processor 260 setting the switching network 256 to produce four beams from the signals provided by the four elements of the array 214 that form the pair of elements 230h and 230a so that the four beams overlap one another. The four beams are then substantially simultaneously produced and provided to the four-channel receiver 264. The receiver 264 determines the phase difference between the two beams formed from the signals produced by the elements of the pair of elements 230h and the phase difference between the two beams formed from the signals produced by the elements that form the pair 230a. Notably, these phase differences are between beams produced from signals provided by elements that are within 180° of one another. More specifically, these phase differences are between beams produced from signals provided by elements that are immediately adjacent to one another. This is in contrast to the first embodiment of the system 20 in which the phase differences are between beams produced from signals provided by elements that are substantially 180° from one another. The two phase differences provide enough information to determine the value of two parameters associated with the object. For instance, the values of θ and Φ can be determined using Equation 1. Notably, the use of the four-channel beamformer to substantially simultaneously generate the four beams also eliminates the need to switch or dither between pairs of elements to obtain the necessary information to determine θ and Φ as was discussed with respect to FIG. 8.

Any arbitrary pairs can be chosen to solve for the location of the target. Small baseline pairs can be used to first get a coarse location of the target. Large baseline pairs can be used to achieve greater accuracy, particularly in the presence of noise. As well, combinations of small and large baselines can be used in one calculation. In addition, a pair can be comprised of adjacent elements or elements separated by other elements. This latter statement makes overlapping pairs possible.

In addition to processing the phases from elements individually using equation 1, the phases can be processed simultaneously in an exact solution. This exact solution relies on the unique relationship between the phase delta of pairs with known radial orientations relative to each other. This enables the processor to obtain an exact solution for ø independent of Θ. The exact o solution is written as $$\phi_t = \tan^{-1}\left[\frac{\sin(\phi_{mn} - ij)}{\cos(\phi_{mn-ij}) - \left(\frac{C_{ij}\,\Delta_{mn}}{C_{mn}\,\Delta_{ij}}\right)}\right] + \phi_{ij} \quad (10)$$

where $\phi_t$ is the ø location of the target relative to the set coordinate system; $\phi_{mn\text{-}ij}$ is the ø separation between the pair comprised of elements m and n and the pair comprised of elements i and j; $C_{ij}$ is the chord length between elements i and j; $C_{mn}$ is the chord length between elements m and n; $\Delta_{mn}$ is the AOA phase delta between elements m and n; $\Delta_{ij}$ is the phase delta between elements i and j; and $\phi_{ij}$ is the average ø position between elements i and j as referenced to the ø=o position on the aircraft.

After determining the $\phi_t$ from this exact solution, Θ can be determined from equation 1. This exact solution can be implemented in any stage of the tracking phase.

Figure 23A:
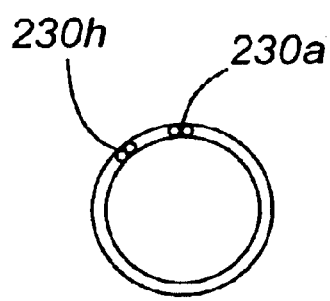
FIGS. 23A–23D illustrates a sample tracking phase using the antenna array shown in FIG. 20.
Figure 23C:
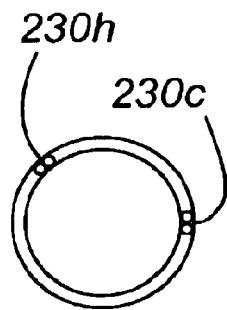
Figure 23B:
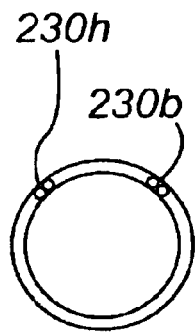

With reference to FIG. 23B, the accuracy of one or more of the parameter values determined from the beams produced by the elements associated with the pair of elements 230h and the pair of elements 230a can be improved by producing a new set of four beams from the signals provided by one of the pair of elements used to produce the original set of beams and the pair of elements that is located approximately 90° away. In this regard, the processor 260 sets the switching network 256 to form beams from the signals produced by the four elements of the array 214 that form the pair of elements 230h and the pair of elements 230b. The four beams overlap one another. Again the four beams are produced substantially simultaneously and provided to the four-channel receiver 264. The four-channel receiver 264 again determines the phase difference between the beams produced from the signals provided by the pair of elements 230h and the phase difference between the beams produced from the signals produced by the pair of elements 230b. The receiver 264 then uses these phase differences in conjunction with the information determined from the original set of four beams to more accurately determine the values of the parameter or parameters determined from the original set of four beams.

Figure 23D:
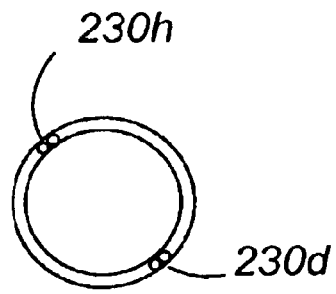

With reference to FIGS. 23C and 23D, the accuracy of one or more parameter values determined from the original four beams and subsequent set of four beams produced from the signals provided by the pair of elements 230h and the pair of elements 230b can be further improved by producing further sets of four beams from pairs of elements that are separated from one another by more than 90°. The operation of the beamformer 234 and the four-channel receiver 264 is identical to that described with respect to FIGS. 23A and 23B. The limit as to the maximum baselines which can be used is determined by the closeness in the level of the amplitude response of the elements.

Figure 24:
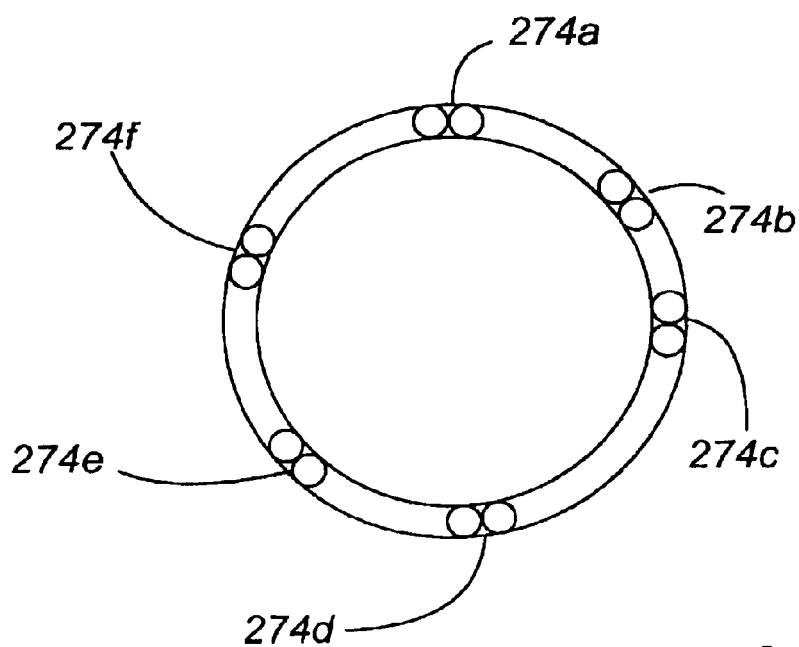
FIG. 24 is a cross-sectional view of six discrete pairs of elements that are unequally spaced from one another.

Another possible configuration for the array 214 is illustrated in FIG. 24. This configuration is comprised of six pair of elements 274a–f with the spacing between at least two adjacent pairs of elements being different than the spacing between another two adjacent pair of elements. Such spacing may be necessary to accommodate other structures located on or within the aircraft 202. Further, this unequal spacing may also reduce the number of pair of elements that are needed to meet the required performance objectives. The spacing between the elements comprising a pair of elements is chosen to reduce ambiguities, as previously discussed, and in accordance with Equation 4.

Another possible configuration of the array 214 employs at least three circumferentially polarized broadband elements located in a ring in the plane 216 and at least three radially polarized broadband elements located in a ring in a plane that is substantially parallel to plane 216. Such an array would eliminate any need that may exist to switch elements between circumferentially and radially polarized modes of reception.

The beamformer 234 used in the third embodiment of the system 20 is also susceptible to a number of variations. At one extreme, a single channel beamformer can be utilized in place of the four-channel beamformer 234. However, sequential lobing must be used to produce each of the beams used in both the acquisition and tracking phases, i.e., the beams must be produced one at a time for both acquisition and tracking phases. At the other extreme, a beamformer can be used that has a number of channels that is equal to the number of elements in the array 214. For instance, a sixteen channel beamformer can be used with the array 214 shown in FIG. 20. In this case, simultaneous lobing can be used to generate all of the beams needed during the acquisition phase, i.e., all of the beams necessary for acquisition can be generated substantially simultaneously. Further, simultaneous lobing can be used to produce all of the beams needed to determine the values of N parameters during the tracking phase if there are N+1 elements from which N+1 beams can be formed.

A beamformer can also be utilized that has more than one channel but a number of channels that is less than the number of elements in the array 214. One possible consideration in deciding upon the number of channels in such a beamformer is the number of parameters that are to be determined. In this regard, N+1 beams are the minimum number of beams that are necessary to determine the values of N parameters in the tracking phase. Consequently, if a beamformer with N+1 channels is used with an antenna array comprised of more than N+1 elements, then the acquisition phase involves a combination of simultaneous lobing and sequential lobing. An example of an acquisition phase that involves both simultaneous and sequential lobing was discussed with respect to FIG. 22. However, the N+1 channels allow the N+1 beams necessary to determine the values of N parameters during the tracking phase to be produced simultaneously.

Relatedly, if N+1 beams are used to determine the values of fewer than N parameters, the values of the parameters can be determined with a greater degree of accuracy than if the values of N parameters are determined. Similarly, if more than N+1 beams (N+1+X beams) are used to determine the values of N parameters, the values of the N parameters can be determined with a greater degree of accuracy than if the values of N+X are determined. This is particularly true assuming f(p)=O or a small constant. Consequently, if a beamformer with N+1 channels is used with an antenna array comprised of more than N+1 elements, the acquisition phase involves simultaneous and sequential lobing. The N+1 channels allow N+1 beams to be simultaneously produced during the tracking phase that allow the values of less than N parameters to be determined with a greater degree of accuracy than if the values of all N parameters are determined using the N+1 beams. The use of more beams than are necessary to determine the values of a number of parameters was discussed with respect to FIG. 23A in which four simultaneously produced beams were used to determine the values of only two parameters assuming f(p)=0 or a known constant. FIGS. 23B–23D illustrated how later sets of beams can be used to determine the values of these two parameters with greater degrees of accuracy.

If necessary, the beamformer 234 can be modified so that the signals produced by two or more elements of the array 214 can be used to form a beam, as discussed with respect to the first embodiment of the system 20. Such a modification would require changing the way in which the processor 260 controls the switching network 256 and the inclusion of power combiners in the beamformer.

Again, the antenna system 20 can be implemented using as few as a two channel receiver and as a receiver with as many channels as there are elements in the array. The larger the number of channels, the larger the number of simultaneous beams which can be compared. The beamformer 234 shown in FIG. 21, however, would require modification of the switching network 256 to change the number of outputs to correspond to the number of channels in the receiver.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. For example, the antenna system of the present invention could be adapted to simultaneously produce three or more spatially independent and overlapping beams to reduce the switching time necessary to resolve ambiguities. The preferred embodiments described herein above is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. An electronically agile antenna system comprising:
a body having an exterior surface, a longitudinal axis and a plane that is substantially perpendicular to said longitudinal axis;
an antenna array that is operatively connected to said body, has at least three elements that are each located in a first ring around a periphery of said body, and is capable of providing a plurality of signals that are representative of the environment about the antenna system, wherein each of said at least three elements is capable of providing one of said plurality of signals; and
a beamformer that includes means for selecting a first portion of said plurality of signals provided by a first subset of elements of said plurality of elements to form a first beam and a second portion of said plurality of signals provided by a second subset of elements of said plurality of elements to form a second beam, wherein selections of said first portion and said second portion vary depending on polarization and location parameters of an object in the vicinity of said body and\or desired accuracies, said beamformer further including means for processing said first portion of said plurality of signals to form said first beam and means for processing said second portion of said plurality of signals to form said second beam, wherein information is obtained using said first and second portions related to said polarization parameters of the object, with said information related to said polarization parameters of the object being used to determine position information related to the object located in the vicinity of said body.

2. An electronically agile antenna system, as claimed in claim 1, wherein:
said body is a missile.

3. An electronically agile antenna system, as claimed in claim 1, wherein:

said antenna array is substantially conformal to said exterior surface.

4. An electronically agile antenna system, as claimed in claim 1, wherein:
said antenna array forms a portion of said exterior surface.

5. An electronically agile antenna system, as claimed in claim 1, wherein:
said exterior surface includes a front surface and a side surface; and
substantially all said antenna array is located on said side surface.

6. An electronically agile antenna system, as claimed in claim 1, wherein:
said antenna array has a field of view of approximately ±60° relative to said longitudinal axis.

7. An electronically agile antenna system, as claimed in claim 1, wherein:
at least one of said at least three elements includes a surface wave mode element.

8. An electronically agile antenna system, as claimed in claim 1, wherein:
at least one of said at least three elements includes one of the following: a wave guide feed and a printed circuit feed.

9. An electronically agile antenna system, as claimed in claim 1, wherein:
at least one of said at least three elements provides a broadband mode of operation.

10. An electronically agile antenna system, as claimed in claim 1, wherein:
at least one of said at least three elements has an endfire pattern.

11. An electronically agile antenna system, as claimed in claim 1, wherein:
said at least three elements includes one of the following: at least three discrete elements, each with a feed and a lens, a single lens with at least three feeds, and a hybrid of at least one discrete element and a single lens with at least two feeds.

12. An electronically agile antenna system, as claimed in claim 1, wherein:
at least one of said at least three elements is one of the following: a radially polarized element and a circumferentially polarized element.

13. An electronically agile antenna system, as claimed in claim 1, wherein:
at least two elements have different polarization responses.

14. An electronically agile antenna system, as claimed in claim 1, wherein:
said first ring has a substantially circular shape.

15. An electronically agile antenna system, as claimed in claim 1, wherein:
said at least three elements that are each located in said first ring include a discrete pair of elements, wherein a distance between the elements comprising said discrete pair of elements is predetermined to aid in resolving ambiguities in the determination of said position information.

16. An electronically agile antenna system, as claimed in claim 1, wherein:
said at least three elements that are each located in said first ring includes a first element, a second element that is located immediately adjacent to said first element, and a third element that is located immediately adjacent to said second element and separated from said first element by said second element, wherein a first distance between said first element and said second element is different than a second distance between said second element and said third element.

17. An electronically agile antenna system, as claimed in claim 16, wherein:
said first distance is predetermined to aid in resolving ambiguities in the determination of said position information.

18. An electronically agile antenna system, as claimed in claim 1, wherein:
said at least three elements that are each located in said first ring includes at least two discrete pair of elements, wherein the two elements comprising each of said at least two discrete pair of elements are separated by a first distance and each of said at least two discrete pair of elements is separated from an immediately adjacent discrete pair of elements by a second distance that is greater than said first distance.

19. An electronically agile antenna system, as claimed in claim 18, wherein:
a first of said at least two discrete pair of elements is separated from a second of said at least two discrete pair of elements by approximately 90° as measured from said longitudinal axis.

20. An electronically agile antenna system, as claimed in claim 1, wherein:
said at least three elements are equally spaced from one another.

21. An electronically agile antenna system, as claimed in claim 1, wherein:
said at least three elements that are each located in said first ring include a plurality of pair of elements, wherein the two elements comprising each of said plurality of pair of elements are separated by a first distance and each of said plurality of pair of elements is separated from an immediately adjacent pair of elements by a second distance that is greater than said first distance and the distance between immediately adjacent pairs of elements is substantially equal.

22. An electronically agile antenna system, as claimed in claim 1 wherein:
said at least three elements that are each located in said first ring includes a plurality of pair of elements, wherein the two elements comprising each of said plurality of pair of elements are separated by a first distance and each of said plurality of pair of elements is separated from an immediately adjacent pair of elements by a second distance that is greater than said first distance and at least two immediately adjacent pair of elements have a different distance therebetween than between a different immediately adjacent pair of elements.

23. An electronically agile antenna system, as claimed in claim 1, wherein:
said at least three elements that are each located in said first ring include at least eight discrete pair of elements.

24. An electronically agile antenna system, as claimed in claim 22, wherein:
said at least eight discrete pair of elements are substantially equally spaced from one another.

25. An electronically agile antenna system, as claimed in claim 1, wherein:
said antenna array includes an element that is located in a second ring that is different from said first ring.

26. An electronically agile antenna system, as claimed in claim 1, wherein:
said first ring is located within said plane; and
said antenna array includes at least three radially polarized elements located in said first ring and at least three circumferentially polarized elements located in a second ring in said plane that is different from said first ring.

27. An electronically agile antenna system, as claimed in claim 1, wherein:
said first subset of elements is immediately adjacent to said second subset of elements.

28. An electronically agile antenna system, as claimed in claim 1, wherein:
said first subset of elements includes only one element;
said second subset of elements includes only one element; and
said first subset of elements is located immediately adjacent to said second subset of elements.

29. An electronically agile antenna system, as claimed in claim 1, wherein:
said beamformer includes means for forming said first beam at a first time and said second beam at a second time that is later than said first time.

30. An electronically agile antenna system, as claimed in claim 1, wherein:
said beamformer includes means for forming said first beam at substantially the same time as said second beam.

31. An electronically agile antenna system, as claimed in claim 1, wherein:
said first beam is spatially independent but overlapping with said second beam.

32. An electronically agile antenna system, as claimed in claim 1, wherein:
said means for processing includes means for performing an amplitude comparison of said first beam and said second beam.

33. An electronically agile antenna system, as claimed in claim 1, wherein:
said means for processing includes means for performing a phase comparison of said first beam and said second beam.

34. An electronically agile antenna system, as claimed in claim 1, wherein:
said means for processing includes means for performing an amplitude comparison and a phase comparison of said first beam and said second beam.

35. An electronically agile, mobile antenna system for use in determining at least one unknown parameter value associated with an object located in the vicinity of the system, comprising:
a body having an exterior surface, a longitudinal axis, and a plane that is substantially perpendicular to said longitudinal axis;
an antenna array that is operatively connected to said body, has a plurality of elements that are each located in a ring around the periphery of said body, and is capable of providing a plurality of signals that are each representative of the environment about the antenna system, wherein each of said plurality of elements is capable of providing one of said plurality of signals and said plurality of elements includes at least one radially oriented element;
a beamformer for processing portions of said plurality of signals provided by subsets of said plurality of elements to produce a plurality of beams; and
means for cooperatively using said plurality of beams to determine said at least one unknown parameter value associated with the object, said means for cooperatively using including means for evaluating an offset f(p) in at least one of phase and amplitude $\Delta$ caused by said at least one radially oriented element whose phase and amplitude response depends on element orientation.

36. An electronically agile, mobile antenna system, as claimed in claim 35, wherein:
said offset f(p) in phase $\Delta$ is a function of polarization parameters of the object.

37. An electronically agile, mobile antenna system, as claimed in claim 35, wherein:
said plurality of elements are located substantially conformal to said exterior surface and include a discrete pair of elements; and
said discrete pair of elements are located substantially in said plane and are one of the following: in equal proximity to each other and in closer proximity to one another than to other of said plurality of elements.

38. An electronically agile, mobile antenna system as claimed in claim 35, wherein:
said beamformer, when at least two of said plurality of beams to be provided to said means for cooperatively using are substantially linearly polarized and a phase difference therebetween is described by:

$$\Delta = d\sin\ominus\cos\phi + f(p)$$

where d relates to the distance between at least two of said elements, $\ominus$ relates to elevation associated with the body relative to the object, $\phi$ relates to azimuth associated with the body relative to the object and f(p) depends on at least one of element polarization parameters and object polarization parameters, includes means for selecting said at least two of said plurality of beams based upon beam strength, phase ambiguity resolution, and desired baselines for azimuth and elevation determination.

39. An electronically agile, mobile antenna system as claimed in claim 35, wherein:
said beamformer, when at least two of said plurality of beams to be provided to said means for cooperatively using are substantially circularly polarized and a phase difference therebetween is described by:

$$\Delta = d\sin\ominus\cos\phi + f(p)$$

where $f(p) = P\cdot\phi$ with P a constant and d relates to the distance between at least two of said elements, $\ominus$ relates to elevation associated with the body relative to the object, $\phi$ relates to azimuth associated with the body relative to the object and f(p) depends on at least one of element polarization parameters and object polarization parameters, includes means for selecting said at least two of said plurality of beams based on signal strength, phase ambiguity resolution, desired baselines for azimuth and elevation determination, and multiple $\phi$ baselines for polarization ambiguity.

40. An electronically agile, mobile antenna system as claimed in claim 35, wherein:
said beamformer, when at least two of said plurality of beams to be provided to said means for cooperatively using are one of linearly polarized and circularly polarized, and a phase difference therebetween is described by:

$$\Delta = d\sin\ominus\cos\phi + f(p)$$

where $f(p) = P\phi$ and $P = 0$ or $P \neq 0$ and d relates to the distance between at least two of said elements, $\ominus$ relates to elevation associated with the body relative to the object, ø relates to azimuth associated with the body relative to the object and f(p) depends on at least one of element polarization parameters and object polarization parameters, includes means for selecting said at least two of said plurality of beams based on signal strength, phase ambiguity resolution, desired baselines for azimuth and elevation determination, and multiple ø baselines for polarization ambiguity.

41. An electronically agile mobile antenna system as claimed in claim 35, wherein:
said beamformer includes a look up table for polarization parameters of said elements that is indexed based upon element location; and
said means for cooperatively using includes means for determining f(p), where f(p) relates to at least one of polarization parameters for the object and said body, using said polarization parameters of at least one of said body and the object and a measured phase difference between beams.

42. An electronically agile mobile antenna system as claimed in claim 35, wherein:
said means for cooperatively using, when at least two of said plurality of beams are of a known polarization and a location of an object is approximately known, includes means for calculating location parameters of the object with two phase difference measurements.

43. An electronically agile mobile antenna system as claimed in claim 35, wherein:
said beamformer includes means for selecting said plurality of beams such that said plurality of beams are derived from portions of said plurality of signals produced by a group of said plurality of elements that are located substantially adjacent to one another.

44. An electronically agile mobile antenna system as claimed in claim 35, wherein:
said beamformer includes means for selecting said plurality of beams such that said plurality of beams are derived from portions of said plurality of signals produced by elements located substantially on opposite sides of said ring to achieve substantially 180° spatial separation for high resolution measurements in a reduced field of view.

45. An electronically agile, mobile antenna system, as claimed in claim 35, wherein:
each of said plurality of elements is a broadband launch element.

46. An electronically agile, mobile antenna system, as claimed in claim 35, wherein:
said plurality of elements includes a plurality of discrete pair of elements.

47. An electronically agile, mobile antenna system, as claimed in claim 35, wherein:
said plurality of elements includes at least two discrete pair of elements and no more than eight discrete pair of elements.

48. An electronically agile, mobile antenna system, as claimed in claim 35, wherein:
each of said subsets of said plurality of elements includes only one element.

49. An electronically agile, mobile antenna system, as claimed in claim 35, wherein:
said beamformer includes only one beamforming channel and means for sequentially using said only one beamformer channel to produce said plurality of beams.

50. An electronically agile, mobile antenna system, as claimed in claim 35, wherein:
said beamformer includes a plurality of beamforming channels and means for simultaneously using said plurality of beamforming channels to produce said plurality of beams.

51. An electronically agile, mobile antenna system, as claimed in claim 35, wherein:
at least two of said plurality of beams are spatially independent and overlapping.

52. An electronically agile, mobile antenna system, as claimed in claim 35, wherein:
all of said plurality beams are spatially independent and overlapping.

53. An electronically agile, mobile antenna system for determining at least one unknown parameter value associated with an object in the vicinity of the system, comprising:
a body having an exterior surface, a longitudinal axis, and a plane that is substantially perpendicular to said longitudinal axis;
an antenna array that is operatively connected to said body, has a plurality of discrete pair of broadband elements that are each located in a ring around a periphery of said body, and is capable of providing a plurality of signals that are each representative of the environment about the antenna system, wherein each element of said plurality of discrete pair of elements is capable of providing one of said plurality of signals;
a beamformer for processing a number of said plurality of signals provided by a number of elements of said plurality of discrete pair of broadband elements to produce a plurality of beams, wherein each element of said number of elements is separated from every other element of said number of elements by less than about 180° relative to said longitudinal axis; and
means for cooperatively using said plurality of beams to determine said at least one unknown parameter value, said means for cooperatively using including means for determining f(p), where f(p) relates to polarization parameters of the object and polarization parameters of the body, by using said polarization parameters of said body and said polarization parameters of the object and a measured phase difference between said plurality of beams.

54. An electronically agile, mobile antenna system, as claimed in claim 53, wherein:
said beamformer includes means for forming a first beam from a first signal provided by a first broadband element of a discrete pair of broadband elements and a second beam from a second broadband element of the same said discrete pair of broadband elements.

55. An electronically agile, mobile antenna system, as claimed in claim 53, wherein:
said beamformer includes means for forming a first beam from a first signal provided by a first broadband element of a first discrete pair of broadband elements, a second beam from a second signal provided by a second broadband element of said first discrete pair of broadband elements, and a third beam from a third signal provided by a third element of a second discrete pair of broadband elements that is different than said first discrete pair of broadband elements.

56. An electronically agile, mobile antenna system, as claimed in claim 55, wherein:
said third element is separated from said first and second elements by less than 90° relative to said longitudinal axis.

57. An electronically agile, mobile antenna system, as claimed in claim 55, wherein:

said third element is separated from said first and second elements by approximately 90° relative to said longitudinal axis.

58. An electronically agile, mobile antenna system, as claimed in claim 53, wherein:
said beamformer includes means for forming first and second beams from first and second signals provided by a first discrete pair of broadband elements and means for forming third and fourth signals from a second discrete pair of broadband elements that is different than said first pair of discrete broadband elements.

59. An electronically agile, mobile antenna system, as claimed in claim 58, wherein:
said first pair of broadband elements is separated from said second pair of broadband elements by less than 90° relative to said longitudinal axis.

60. An electronically agile, mobile antenna system, as claimed in claim 58, wherein:
said first pair of broadband elements is separated from said second pair of broadband elements by approximately 90° relative to said longitudinal axis.

61. An electronically agile, mobile antenna system, as claimed in claim 58, wherein:
said beamformer includes means for selecting said beams such that said beams are derived from portions of said plurality of signals produced by elements located substantially on opposite sides of said ring to achieve substantially 180° spatial separation for high resolution measurements in a reduced field of view.

62. A method for operating an electronically agile, mobile antenna system for determining location information associated with an object in the vicinity of said system, comprising:
providing a body having an exterior surface, a longitudinal axis, and a plane that is substantially perpendicular to said longitudinal axis;
providing an antenna array that is operatively connected to said body, has a plurality of elements that are each located in a ring around a periphery of said body, and is capable of providing a plurality of signals that are representative of the environment about the antenna system, wherein each of said elements is capable of providing one of said plurality of signals;
forming a first plurality of beams from said plurality of signals provided by said antenna array;
acquiring coarse information related to location of the object by comparing the amplitudes of said first plurality of beams to one another;
generating, after said step of acquiring is completed, a second plurality of beams, with said second plurality of beams being different from said first plurality of beams based on information from said first plurality of beams; and
tracking fine information related to location of said object by using at least one of phases and amplitudes of said second plurality of beams, while not using at least some of said first plurality of beams that are different from said second plurality of beams.

63. A method, as claimed in claim 62, wherein:
said step of forming a first plurality of beams includes forming at least one of said plurality of beams at a different time than another of said first plurality of beams.

64. A method, as claimed in claim 62, wherein:
said step of forming a first plurality of beams includes forming all of said first plurality of beams at substantially the same time.

65. A method, as claimed in claim 62, wherein:
said step of generating second plurality of beams includes generating at least one of second plurality of beams at a different time than another of said second plurality of beams.

66. A method, as claimed in claim 62, wherein:
said step of generating a second plurality of beams includes generating all of said second plurality of beams at substantially the same time.

67. A method, as claimed in claim 62, wherein:
said step of generating a second plurality of beams includes generating spatially independent and overlapping beams.

68. A method, as claimed in claim 62, wherein:
said step of tracking includes comparing a first phase of a first beam produced using a first subset of said plurality of elements to a second phase of a second beam produced from using a second subset of said plurality of elements, wherein said first subset of elements is separated from said second subset of elements by less than 90° relative to said roll plane.

69. A method, as claimed in claim 62, wherein:
said step of tracking includes comparing a first phase of a first beam produced using a first subset of elements of said plurality of elements to a second phase of a second beam produced using a second subset of said plurality of elements, wherein said first subset of elements is separated from said second subset of elements by approximately 90°.

70. A method, as claimed in claim 62, wherein:
said step of forming includes selecting said beams such that said beams are derived from portions of said plurality of signals produced by elements located substantially on opposite sides of said ring to achieve substantially 180° spatial separation for high resolution measurements in a reduced field of view.

71. A method, as claimed in claim 62, wherein:
each of said at least three elements has a polarization vector that differs from a polarization vector of each of the other of said elements, with each of said polarization vectors of each of said elements depending upon location of said elements on said body.

72. A method, as claimed in claim 62, wherein:
said step of forming includes using a first baseline related to element spacing and said step of generating includes using a second baseline related to element spacing, with said second baseline being greater than said first baseline.

73. A method, as claimed in claim 62, wherein:
said step of tracking includes obtaining information related to polarization parameters of said object.

74. A method, as claimed in claim 62, wherein:
said second plurality of beams is chosen based upon at least one polarization parameter of said object.

75. A method for operating an electronically agile, mobile antenna system for determining location information associated with an object in the vicinity of said system, comprising:
providing a body having an exterior surface, a longitudinal axis, and a plane that is substantially perpendicular to said longitudinal axis;

providing an antenna array that is operatively connected to said body, has a plurality of elements that are each located in a ring around a periphery of said body, and is capable of providing a plurality of signals that are representative of the environment about the antenna system, wherein each of said elements is capable of providing one of said plurality of signals;

forming a first plurality of beams from said plurality of signals provided by said antenna array;

selecting a first two beams from said first plurality of beams, said first two beams having a first baseline, said first baseline depending upon a spacing between first and second elements that are used to form said first two beams;

generating a second plurality of beams from said plurality of elements of said antenna array;

choosing a second two beams from said second plurality of beams, said second two beams having a second baseline that is different from said first baseline, said second baseline depending upon a spacing between third and fourth elements that are used to form said second two beams; and determining location information associated with said object using at least said first two beams and said second two beams.

* * * * *

UNITED STATES PATENT AND TRADEMARK OFFICE
CERTIFICATE OF CORRECTION

PATENT NO. : 6,771,218 B1 Page 1 of 1
DATED : August 3, 2004
INVENTOR(S) : Lalezari et al.

It is certified that error appears in the above-identified patent and that said Letters Patent is hereby corrected as shown below:

<u>Title page,</u>
Item [*] Notice, delete "1,825" and insert -- 0 -- therefor

Signed and Sealed this

Ninth Day of August, 2005

JON W. DUDAS
*Director of the United States Patent and Trademark Office*